(12) United States Patent
Senda et al.

(10) Patent No.: US 8,593,442 B2
(45) Date of Patent: Nov. 26, 2013

(54) SENSOR DEVICE, METHOD OF DRIVING SENSOR ELEMENT, DISPLAY DEVICE WITH INPUT FUNCTION AND ELECTRONIC APPARATUS

(75) Inventors: Michiru Senda, Aichi (JP); Makoto Takatoku, Aichi (JP); Tsutomu Harada, Aichi (JP)

(73) Assignee: Japan Display West Inc., Tokyo (JP)

( * ) Notice: Subject to any disclaimer, the term of this patent is extended or adjusted under 35 U.S.C. 154(b) by 343 days.

(21) Appl. No.: 12/941,276

(22) Filed: Nov. 8, 2010

(65) Prior Publication Data

US 2011/0115767 A1 May 19, 2011

(30) Foreign Application Priority Data

Nov. 13, 2009 (JP) .................................. 2009-260255

(51) Int. Cl.
*G09G 5/00* (2006.01)
(52) U.S. Cl.
USPC .......................................................... 345/207
(58) Field of Classification Search
USPC .......................................................... 345/175
See application file for complete search history.

(56) References Cited

U.S. PATENT DOCUMENTS

| | | | | |
|---|---|---|---|---|
| 4,473,797 A | * | 9/1984 | Shiota | 324/115 |
| 8,085,251 B2 | * | 12/2011 | Harada et al. | 345/173 |
| 8,199,083 B2 | * | 6/2012 | Fukunaga et al. | 345/84 |
| 2007/0268206 A1 | | 11/2007 | Kinoshita et al. | |
| 2008/0198143 A1 | | 8/2008 | Kinoshita et al. | |
| 2010/0020009 A1 | * | 1/2010 | Nakanishi | 345/102 |
| 2010/0097354 A1 | * | 4/2010 | Ahn et al. | 345/175 |

FOREIGN PATENT DOCUMENTS

| | | |
|---|---|---|
| JP | 2006-276223 A | 10/2006 |
| JP | 2007-018458 A | 1/2007 |
| JP | 2007-310628 A | 11/2007 |
| JP | 2008-203504 A | 9/2008 |
| JP | 2008-233257 A | 10/2008 |
| JP | 2009-193096 A | 8/2009 |
| WO | WO 2009/057561 A1 | 5/2009 |
| WO | WO 2009/119417 A1 | 10/2009 |

* cited by examiner

*Primary Examiner* — Srilakshmi K Kumar
*Assistant Examiner* — Joseph Fox
(74) *Attorney, Agent, or Firm* — Wolf, Greenfield & Sacks, P.C.

(57) ABSTRACT

Techniques are described for detecting and compensating for characteristic changes of a photoelectric conversion element, such as changes related to the temperature of the photoelectric conversion element. A display device that includes an I/O display panel and a light-receiving drive circuit is disclosed. The I/O display panel includes a plurality of display pixels; and a plurality of photoelectric conversion elements including a first photoelectric conversion element that substantially is shielded from light and a second photoelectric conversion element that is exposed to light. The light-receiving drive circuit receives a first detection signal from the first photoelectric conversion element and resets the second photoelectric conversion element based on the first detection signal.

18 Claims, 24 Drawing Sheets

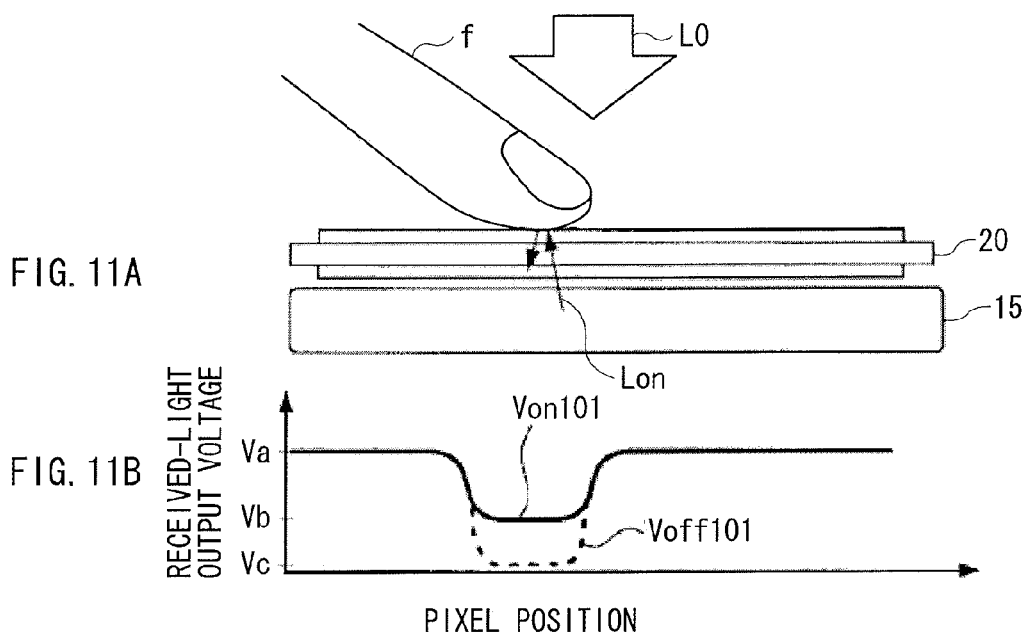
FIG. 11A
FIG. 11B
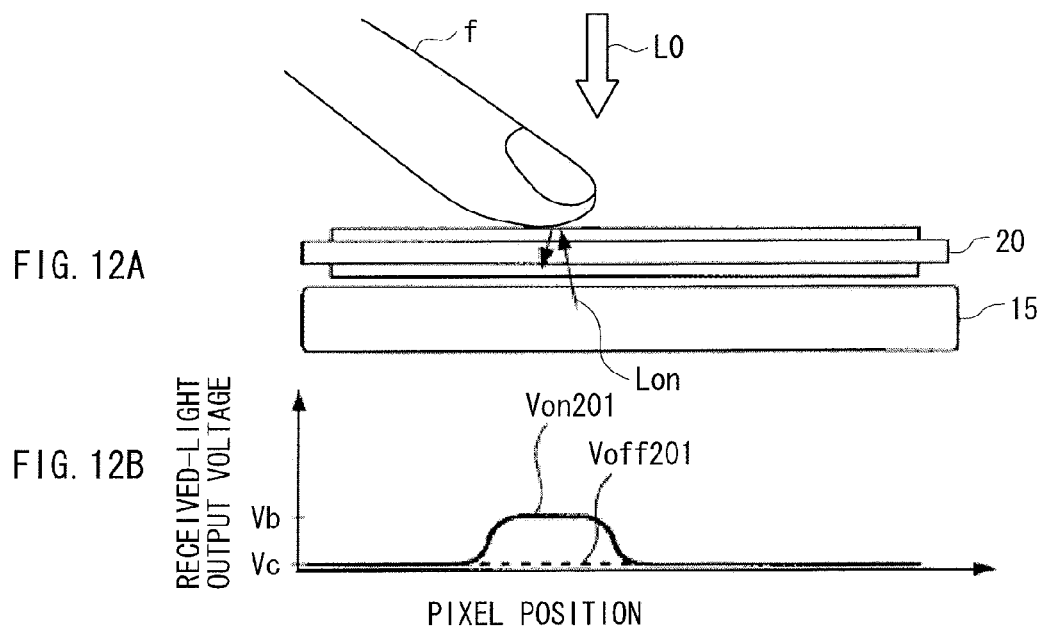
FIG. 12A
FIG. 12B

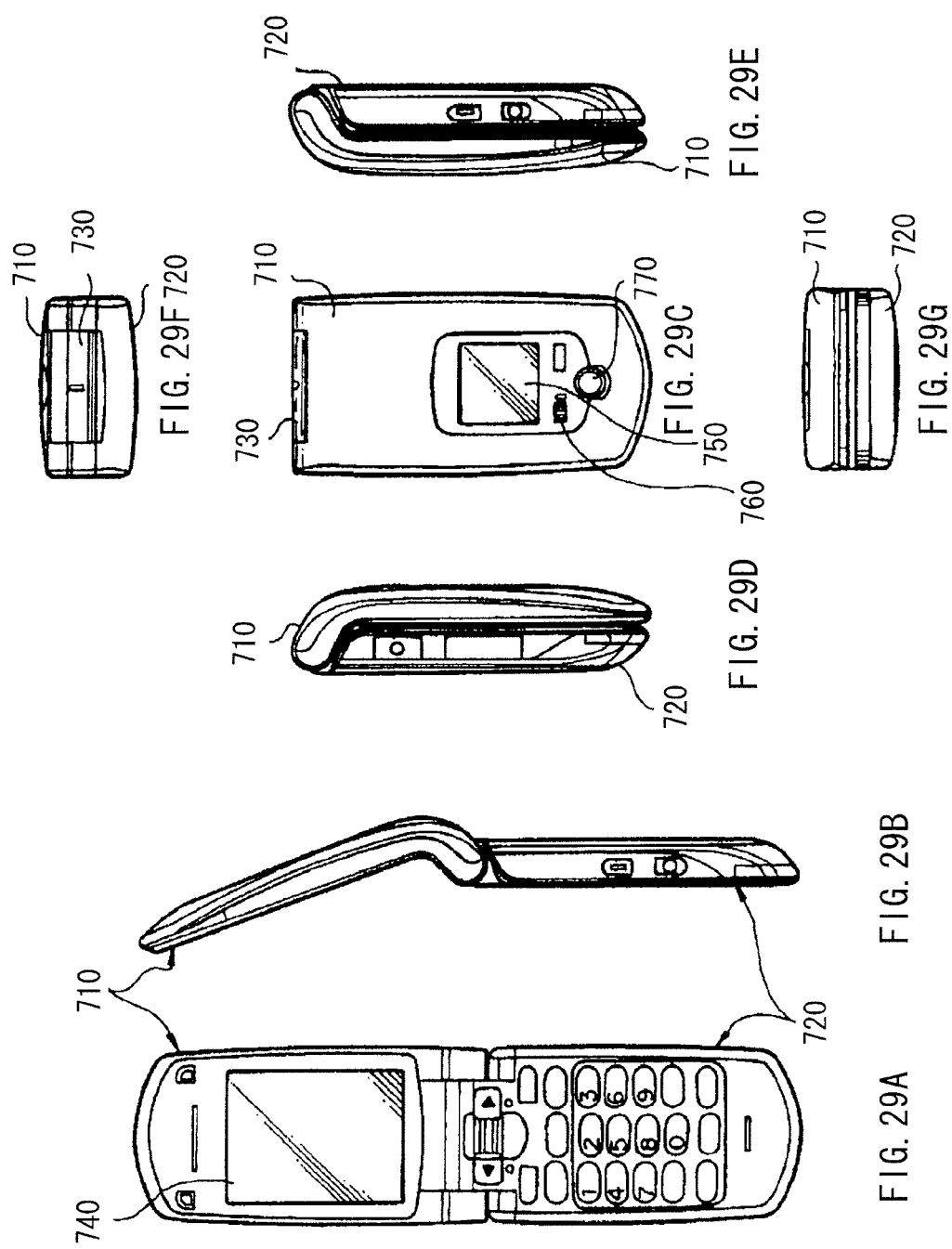

SENSOR DEVICE, METHOD OF DRIVING SENSOR ELEMENT, DISPLAY DEVICE WITH INPUT FUNCTION AND ELECTRONIC APPARATUS

BACKGROUND OF THE INVENTION

1. Field of the Invention

The present invention relates to a sensor device that detects the position and the like of a nearby object by using a sensor element, a method of driving a sensor element applied to such a sensor device, a display device that includes a sensor function (input function) and a display function, and an electronic apparatus that includes such a display device.

2. Description of the Related Art

Previously, there have been known techniques of detecting the position or the like of an object touching or close to a display surface of a display device. For example, there is known a technique providing such a structure that a film-like transparent touch panel is disposed to be laid on a display panel. As a system of such a display panel, a pressure sensitive type and a capacitance type have been previously known.

Further, there has been developed a display device in which display pixels and light-receiving elements are arranged in a matrix form within a display panel so that the display panel itself has an optical sensor function (see Japanese Unexamined Patent Application Publications No. 2006-276223 and No. 2008-233257).

SUMMARY OF THE INVENTION

In the display device having the optical sensor function as mentioned above, a photoelectric conversion element such as a PIN photodiode is used as the light-receiving element. Electric charge generated according to an amount of received light and supplied from the photoelectric conversion element is stored in a storage node, and a voltage value according to the stored electric charge of the storage node is read out and output as a sensor detection signal. An amount of light entering the photoelectric conversion element changes according to the position, distance, size and the like of an object close to a panel surface and thus the sensor detection signal changes as well. Therefore, it is possible to detect the position and the like of the object close to the surface of the panel, by appropriately processing the sensor detection signal from each of the light receiving elements arranged in the matrix form. In such a device, read operation is carried out after a predetermined light-receiving (exposure) period by the photoelectric conversion element and then, after the voltage value of the storage node is reset to a reset voltage, operation of light receiving and reading is repeated.

Incidentally, it is known that in the photoelectric conversion element, a dark current (thermal excitation current) flows even in a state of no incident light. This dark current changes with temperature and has such a characteristic that the higher the temperature is, the larger the amount of flowing current is. For this reason, there is a case in which even when the amount of incident light is constant, the voltage of the storage node changes if the temperature is different, which adversely affects a detection result. In particular, there is a possibility that when the temperature becomes higher, an influence of the dark current increases, which raises the voltage of the storage node, thereby leading to a saturated state of the storage node. Therefore, it is desired that some measures be taken to reduce this influence of the dark current which accompanies a change in temperature, but the measures in the past are insufficient.

In view of the foregoing, it is desirable to provide a sensor device, a method of driving a sensor element, a display device with an input function, and an electronic apparatus, which are capable of performing stable detection operation by reducing the influence of the dark current accompanying a change in temperature.

Some embodiments relate to a photoelectric conversion method. A first detection signal is received from a first photoelectric conversion element that substantially is shielded from light. A voltage is reset at a storage node of a second photoelectric conversion element that is exposed to light, based on the first detection signal. A second detection signal is generated based on the light received at the second photoelectric conversion element. Some embodiments relate to an apparatus that includes a reset voltage control circuit. The reset voltage control circuit receives a first detection signal from a first photoelectric conversion element that substantially is shielded from light, and controls a storage node voltage of a second photoelectric conversion element to be reset based on the first detection signal. The second photoelectric conversion element is exposed to light. Some embodiments relate to a display device that includes an I/O display panel and a light-receiving drive circuit. The I/O display panel includes a plurality of display pixels; and a plurality of photoelectric conversion elements including a first photoelectric conversion element that substantially is shielded from light and a second photoelectric conversion element that is exposed to light. The light-receiving drive circuit receives a first detection signal from the first photoelectric conversion element and resets the second photoelectric conversion element based on the first detection signal. Some embodiments relate to an electronic apparatus comprising the display device.

Some embodiments relate to a photoelectric conversion method that includes detecting characteristic changes of a photoelectric conversion element. The photoelectric conversion element is controlled to compensate for the characteristic changes. A detection signal is generated based on the light received at the photoelectric conversion element. Some embodiments relate to an apparatus that includes a detection circuit that detects characteristic changes of a photoelectric conversion element. The apparatus also includes a control circuit that controls a photoelectric conversion element to be reset based on the characteristic changes.

In the sensor device, the method of driving the sensor element, the display device with the input function or the electronic apparatus according to the embodiment of the present invention, the reset voltage for resetting the voltage value of the storage node in the sensor element is variably controlled according to the characteristic change of the photoelectric conversion element due to the temperature. Therefore, it is possible to perform stable detection operation by reducing the influence of the dark current accompanying a change in temperature.

Other and further objects, features and advantages of the invention will appear more fully from the following description.

BRIEF DESCRIPTION OF THE DRAWINGS

FIGS. 11A and 11B are a diagram that illustrates a state in which a nearby object is in the sensor area when there is strong external light, and a diagram that illustrates an example of a sensor output voltage in such a state, respectively, in the display device illustrated in FIG. 1;

FIGS. 12A and 12B are a diagram that illustrates a state in which a nearby object is in the sensor area when there is weak external light, and a diagram that illustrates an example of a sensor output voltage in such a state, respectively, in the display device illustrated in FIG. 1;

FIGS. 29A through 29G are diagrams that illustrate a fifth application example, namely, FIGS. 29A and 29B are a front view and a side view in an open state, respectively, and FIGS. 29C through 29G are a front view, a left-side view, a right-side view, a top view, and a bottom view in a closed state, respectively.

DETAILED DESCRIPTION OF THE PREFERRED EMBODIMENTS

Embodiments of the present invention will be described below in detail with reference to the drawings.

Entire Configuration of Display Device with Input Function

Figure 1:
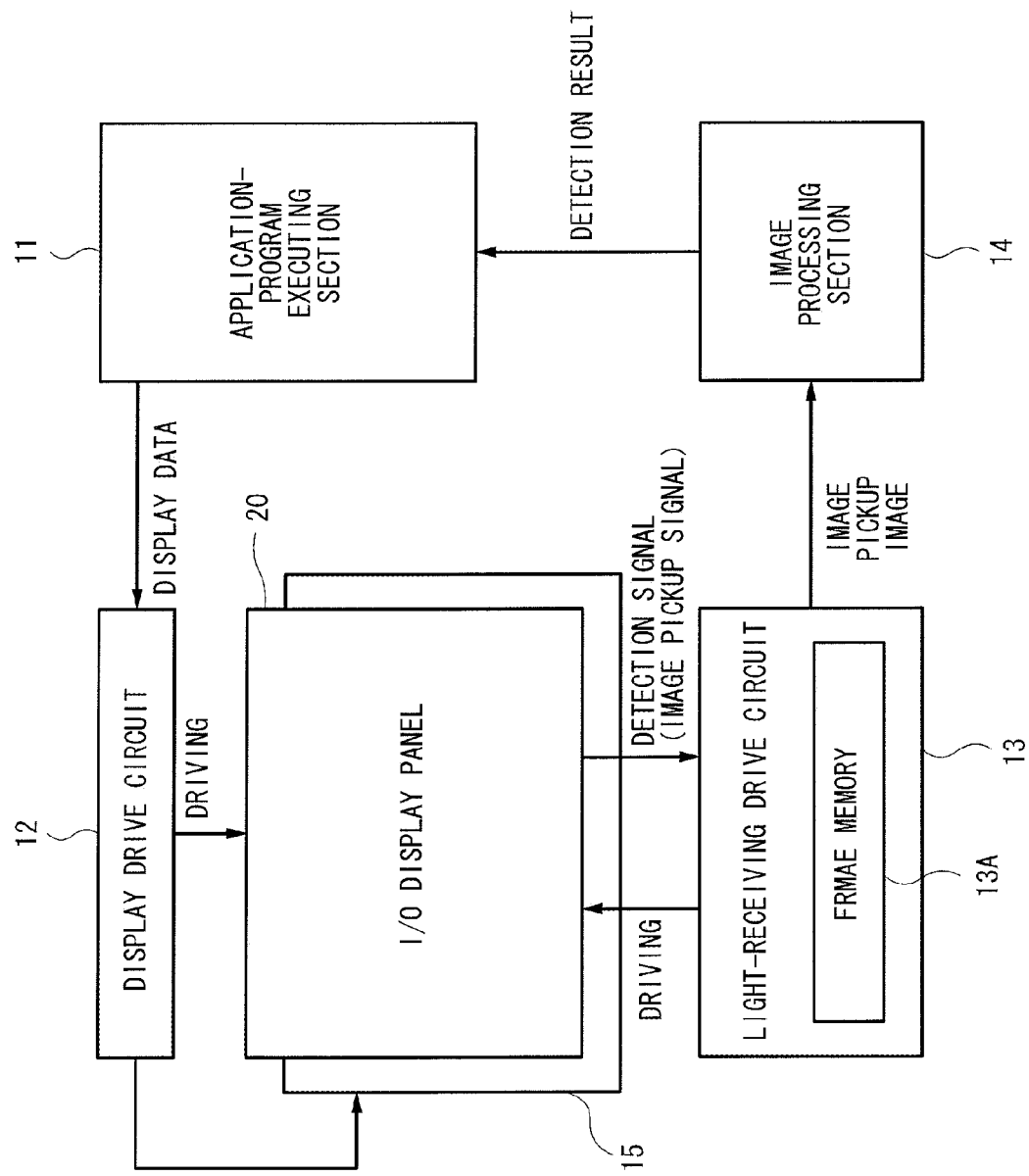
FIG. 1 is a block diagram that illustrates a configurational example of a display device with an input function according to an embodiment of the present invention.

FIG. 1 illustrates an example of the entire configuration of a display device (display image-pickup device) with an input function according to an embodiment of the present invention. This display device includes an I/O display panel 20, a backlight 15, a display drive circuit 12, a light-receiving drive circuit 13, an image processing section 14, and an application-program executing section 11.

Figure 3:
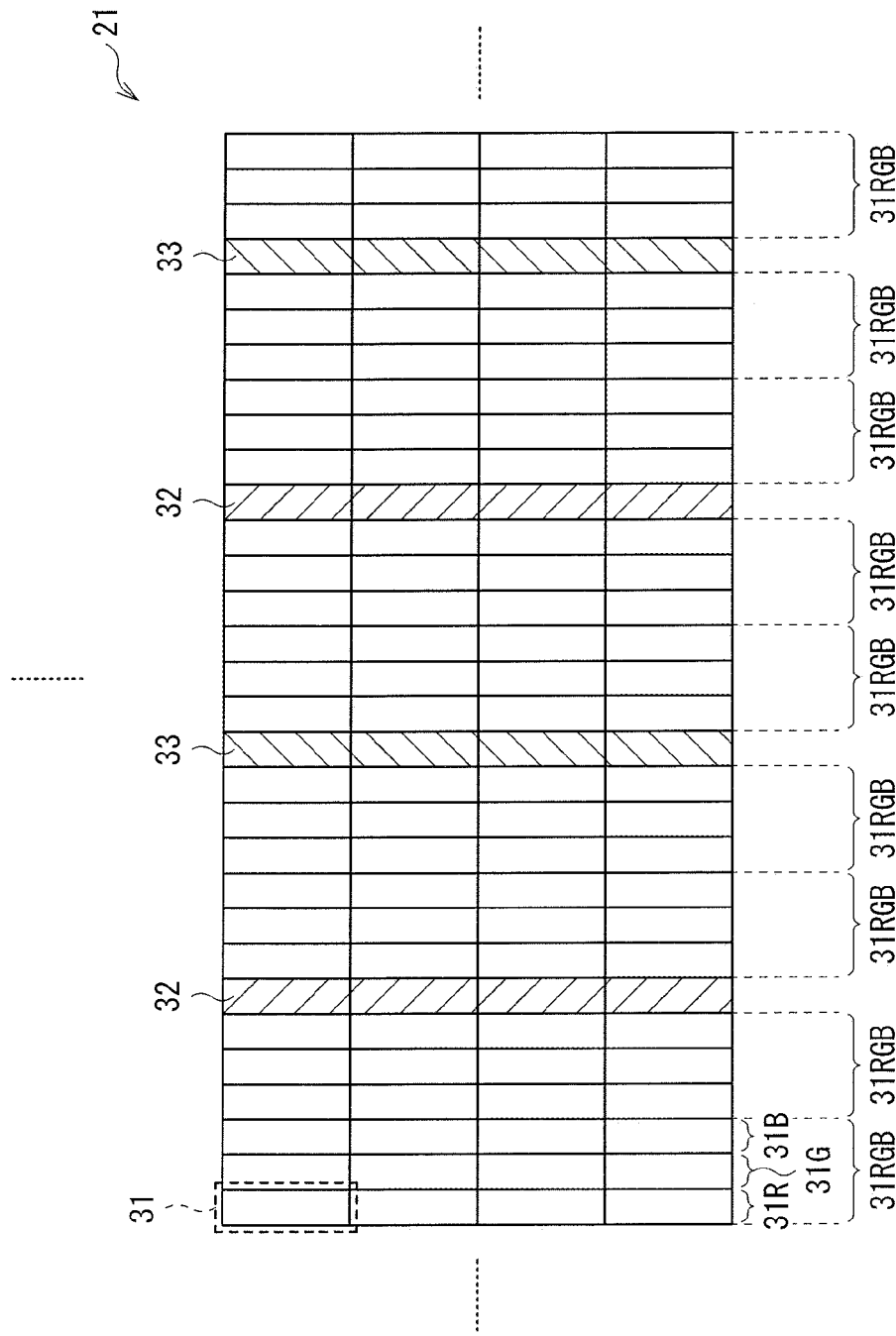
FIG. 3 is a plan view that illustrates an example of pixel arrangement in a display area (sensor area) illustrated in FIG. 2.

The I/O display panel 20 is, for example, a Liquid Crystal Display (LCD) panel. The I/O display panel 20 includes plural display pixels 31RGB arranged in a matrix form as illustrated in FIG. 3 to be described later, and has a function of displaying (display function) a predetermined image such as graphics and characters based on image data while line-sequentially operating these display pixels. The I/O display panel 20 further includes sensor elements 33 arranged as image pickup pixels in a matrix form as illustrated in FIG. 3 to be described later, and has a function to serve as a sensor panel (detection function, image pickup function) that detects and images an object (nearby object) touching or close to a panel surface. Further, in the I/O display panel 20, at least one monitor sensor 33M (FIG. 6 and FIG. 7) is disposed in an area different from an area where the sensor elements 33 are disposed.

The backlight 15 is a light source for display and detection in the I/O display panel 20, and includes, for example, arranged plural light-emitting diodes. The backlight 15 is driven and controlled by the display drive circuit 12, and is capable of performing on-off (illuminating and not illuminating) operation at a high speed based on predetermined timing synchronized with operation timing of the I/O display panel 20, which will be described later. The backlight 15 emits illuminating light Lon periodically from a rear side of the I/O display panel 20 toward the panel surface.

The display drive circuit 12 is a circuit that drives the display pixels 31RGB of the I/O display panel 20 (i.e. performs driving of line-sequential display operation), so that an image is displayed on the I/O display panel 20 based on display data (i.e. so that display operation is performed). The display drive circuit 12 also performs on-off (illuminating and not illuminating) control of the backlight 15.

The light-receiving drive circuit 13 is a circuit that drives the I/O display panel 20 (i.e. performs driving of line-sequential image pickup operation), so that a sensor detection signal (image pickup signal) is obtained from each of the sensor elements (image pickup pixels) 33 of the I/O display panel 20 (i.e. so that an object is detected or imaged). Incidentally, the sensor detection signals (image pickup signals) from the respective sensor elements 33 are stored in a frame memory 13A, for example, per frame, and output to the image processing section 14 as a detected image (picked-up image). The light-receiving drive circuit 13 includes a reset-voltage control section 16 (FIG. 8) that will be described later.

The image processing section 14 performs predetermined image processing (arithmetic processing) based on the picked-up image output from the light-receiving drive circuit 13. As a result of performing the image processing, the image processing section 14 detects and obtains, for example, object information about an object (positional coordinates data, data related to the shape and size of the object, and the like) that has made an approach or the like to the I/O display panel 20.

Based on a detection result obtained by the image processing section 14, the application-program executing section 11 performs processing according to a predetermined piece of application software. As an example of this processing, there is processing of including the positional coordinates of the detected object in the display data to be displayed on the I/O display panel 20. Incidentally, the display data produced by the application-program executing section 11 is supplied to the display drive circuit 12.

Configurational Example of I/O Display Panel 20

Figure 2:
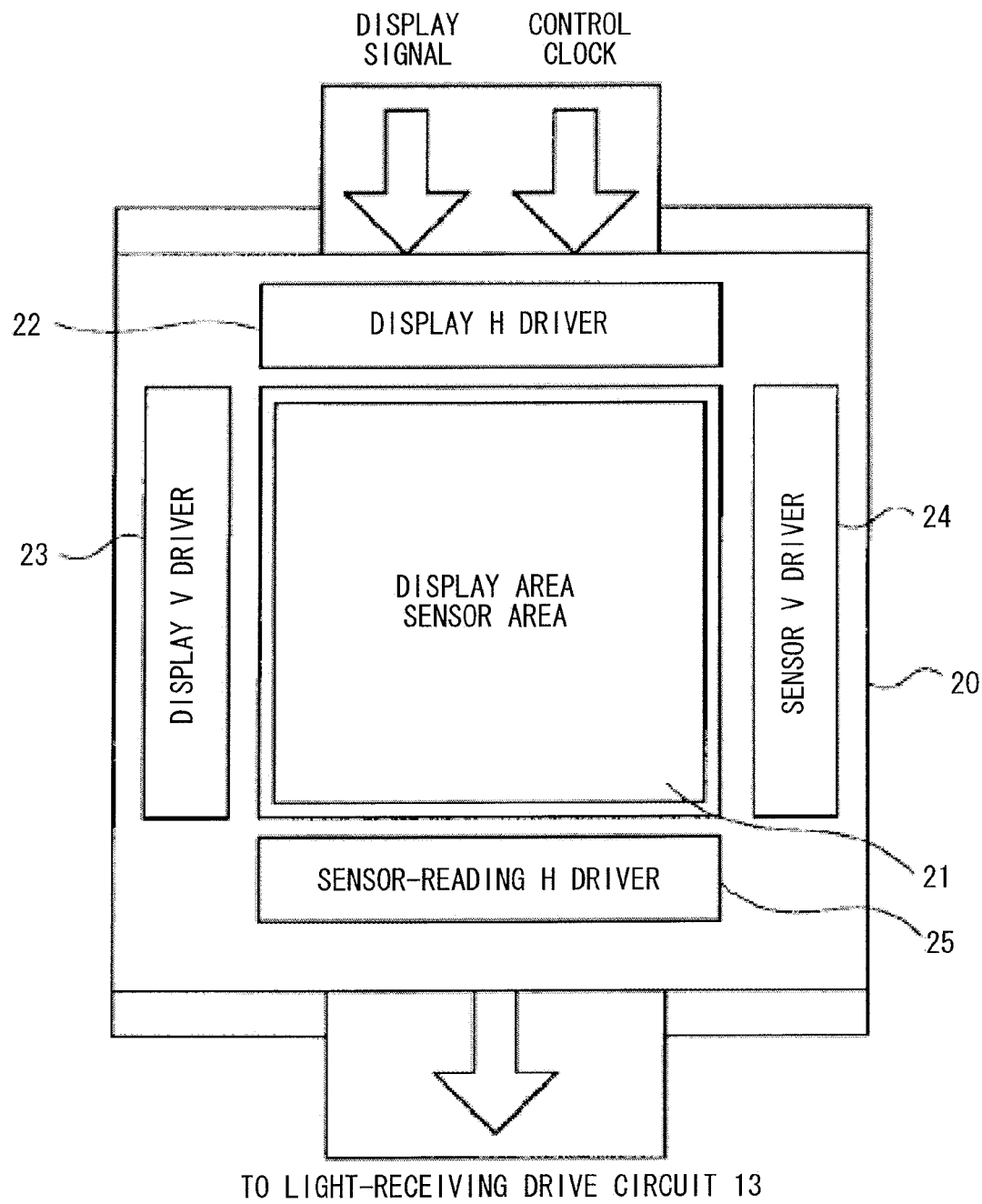
FIG. 2 is a block diagram that illustrates a configurational example of an I/O display panel illustrated in FIG. 1.

FIG. 2 illustrates a configurational example of the I/O display panel 20. The I/O display panel 20 includes a display area (sensor area) 21, a display H driver 22, a display V driver 23, a sensor-reading H driver 25, and a sensor V driver 24.

The light-receiving drive circuit 13, the sensor V driver 24, the sensor-reading H driver 25 in FIG. 1 and FIG. 2 combined are a specific example of the "means for driving the sensor element" according to the embodiment of the present invention. The display drive circuit 12, the display H driver 22, and the display V driver 23 combined are a specific example of the "means for driving the plural display pixels" according to the embodiment of the present invention. The I/O display panel 20 is a specific example of the "display panel" and the "sensor panel" according to the embodiment of the present invention. The light-receiving drive circuit 13 and the image processing section 14 combined are a specific example of the "means for processing a signal" according to the embodiment of the present invention.

The display area (sensor area) 21 is an area that modulates light from the backlight 15 and emits the modulated light as irradiation light (hereinafter referring to light that includes display light and irradiation light for detection emitted by, for example, an infrared light source (not illustrated)). The display area (sensor area) 21 is also an area that detects (images) an object touching or close to this area. In the display area (sensor area) 21, for example, liquid crystal display elements serving as the display pixels 31RGB and the sensor elements 33 that will be described later are arranged in respective matrix forms.

Based on display signals for display driving and control clocks supplied by the display drive circuit 12, the display H driver 22 line-sequentially drives, together with the display V driver 23, the display pixels 31RGB within the display area 21.

According to driving control by the light-receiving drive circuit 13, the sensor-reading H driver 25, together with the sensor V driver 24, line-sequentially drives the sensor elements 33 serving as the image pickup pixels within the sensor area 21, and obtains detection signals (image pickup signals). The light-receiving drive circuit 13 is configured to carry out, when the irradiation light is emitted from the backlight 15 to a nearby object, driving control to store electric charge for charging in the sensor elements 33 according to a sum of an amount of reflected light resulting from the irradiation light and an amount of ambient light (external light). Also, the light-receiving drive circuit 13 is configured to carry out, when the irradiation light is not emitted from the backlight 15, driving control to store electric charge for charging in the sensor elements 33 according to an amount of ambient light. The sensor-reading H driver 25 is configured to output, to the light-receiving drive circuit 13, the detection signals (image pickup signals) at the time when the backlight 15 is on and the detection signals (image pickup signals) at the time when the backlight 15 is off, which are obtained from the sensor elements 33 through these kinds of driving control.

Figure 4:
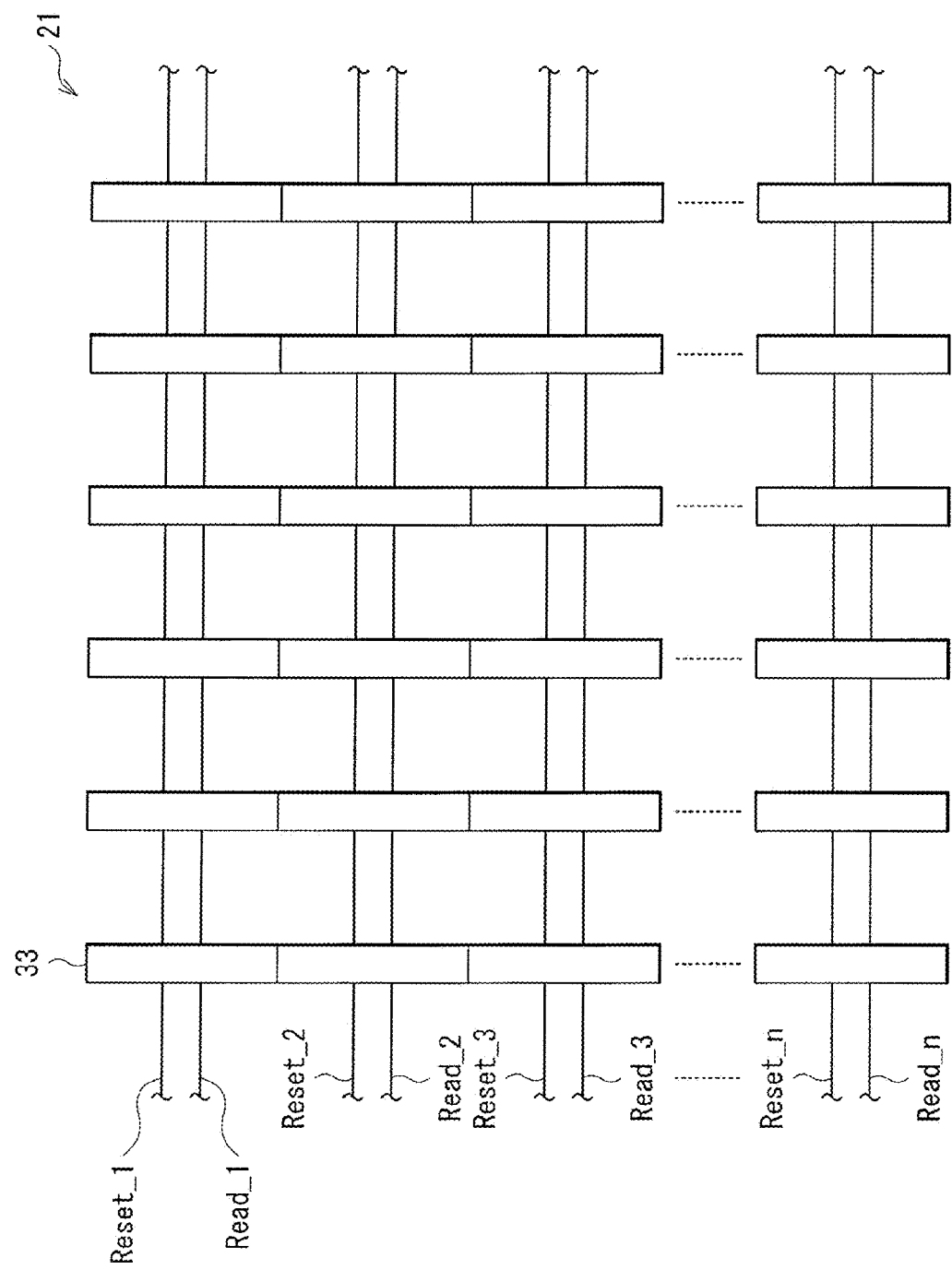
FIG. 4 is a schematic plan view that illustrates an example of a connection relation between sensor elements (image pickup pixels) and signal lines in the pixel arrangement illustrated in FIG. 3.

FIG. 3 illustrates a detailed configurational example of each pixel in the display area (sensor area) 21. For example, as illustrated in FIG. 3, pixels 31 of the display area 21 include the display pixels 31RGB, the sensor elements 33 serving as the image pickup pixels, and wiring sections 32 in which wirings for the sensor 2 elements 33 are formed. Each of the display pixels 31RGB includes a display pixel 31R for red (R), a display pixel 31G for green (G) and a display pixel 31B for blue (B). The display pixels 31RGB, the sensor elements 33 and the wiring sections 32 are arranged in the respective matrix forms on the display area (sensor area) 21. Further, the sensor elements 33 and the wiring sections 32 for driving the sensor elements 33 are arranged to be separated from each other periodically. Thanks to such an arrangement, the sensor area including the sensor elements 33 and the wiring sections 32 is extremely hard to recognize relative to the display pixels 31RGB, and a reduction in aperture ratio in the display pixels 31RGB is suppressed to a minimum. Furthermore, when the wiring sections 32 are disposed in an area that does not contribute to the aperture of the display pixels 31RGB (for example, an area shielded from light by a black matrix, or a reflection area), it is possible to dispose a light-receiving circuit without reducing display quality. Incidentally, for example, as illustrated in FIG. 4, reset-control signal lines Reset_1 through Reset_n and read-control signal lines Read_1 through Read_n are connected to each of the sensor elements 33, along a horizontal line direction.

Configurational Example of Sensor Element 33

Figure 5:
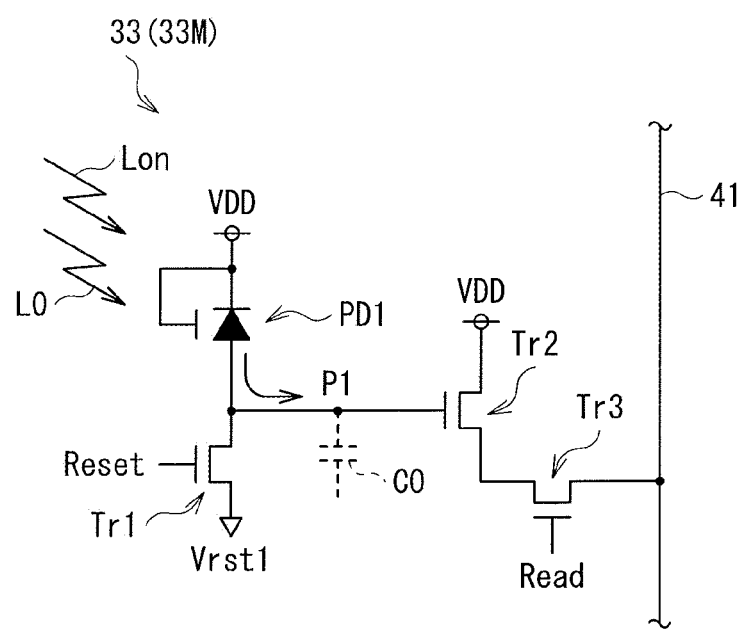
FIG. 5 is a circuit diagram that represents a configurational example of a sensor element in the display device illustrated in FIG. 1.

For example, as illustrated in FIG. 5, the sensor element 33 includes a photoelectric conversion element PD1, a reset transistor Tr1, a storage node P1, an amplification transistor Tr2 and a select/read transistor Tr3.

The photoelectric conversion element PD1 generates electric charge according to an amount of incident light and is, for example, a PIN photodiode. The PIN photodiode has a p-type semiconductor region, an n-type semiconductor region and an intrinsic semiconductor region (i region) formed between the p-type semiconductor region and the n-type semiconductor region. The photoelectric conversion element PD1 has an anode electrode, a cathode electrode and a gate electrode. When the photoelectric conversion element PD1 is the PIN photodiode, the anode electrode is connected to the p-type semiconductor region, and the cathode electrode is connected to the n-type semiconductor region. The cathode electrode of the photoelectric conversion element PD1 is connected to a power supply line for supplying a power supply voltage VDD. The anode electrode of the photoelectric conversion element PD1 is connected to one end (drain) of the reset transistor Tr1.

The storage node P1 is connected to the anode electrode of the photoelectric conversion element PD1 and the drain of the reset transistor Tr1. In the storage node P1, electric charge converted by the photoelectric conversion element PD1 is stored and the voltage changes according to the stored electric charge. In the storage node P1, a storage capacitance C0 is equivalently formed by a parasitic capacitance or the like due to wiring. The electric charge is stored based on this storage capacitance C0.

Each of the reset transistor Tr1, the amplification transistor Tr2 and the select/read transistor Tr3 includes, for example, a Thin Film Transistor (TFT) and the like.

A gate of the reset transistor Tr1 is connected to the reset-control signal line Reset (see FIG. 4), and a source of the reset transistor Tr1 is connected to a reset voltage Vrst1. The drain of the reset transistor Tr1 and a gate of the amplification transistor Tr2 are connected to the storage node P1. A source of the amplification transistor Tr2 is connected to the power supply line for supplying the power supply voltage VDD. A drain of the amplification transistor Tr2 is connected to a drain of the select/read transistor Tr3. A gate of the select/read transistor Tr3 is connected to the read-control signal line Read for supplying a read-control signal, and a source of the select/read transistor Tr3 is connected to a readout line 41.

The reset transistor Tr1 is used to reset the voltage value of the storage node P1 to the reset voltage Vrst1 (to release the electric charge stored in the storage node P1). The reset voltage Vrst1 supplied to the reset transistor Tr1 is variably controlled by the reset-voltage control section 16 (FIG. 8) that will be described later.

The amplification transistor Tr2 and the select/read transistor Tr3 form a source follower, and read the voltage value according to the electric charge stored in the storage node P1 and output the read voltage value as the sensor detection signal. The sensor detection signal is output to the readout line 41 at the time when the select/read transistor Tr3 is turned on in response to the read-control signal applied to the gate. The amplification transistor Tr2 and the select/read transistor Tr3 combined are a specific example of the "means for reading" according to the embodiment of the present invention.

Configurational Example of Monitor Sensor 33M

Figure 6:
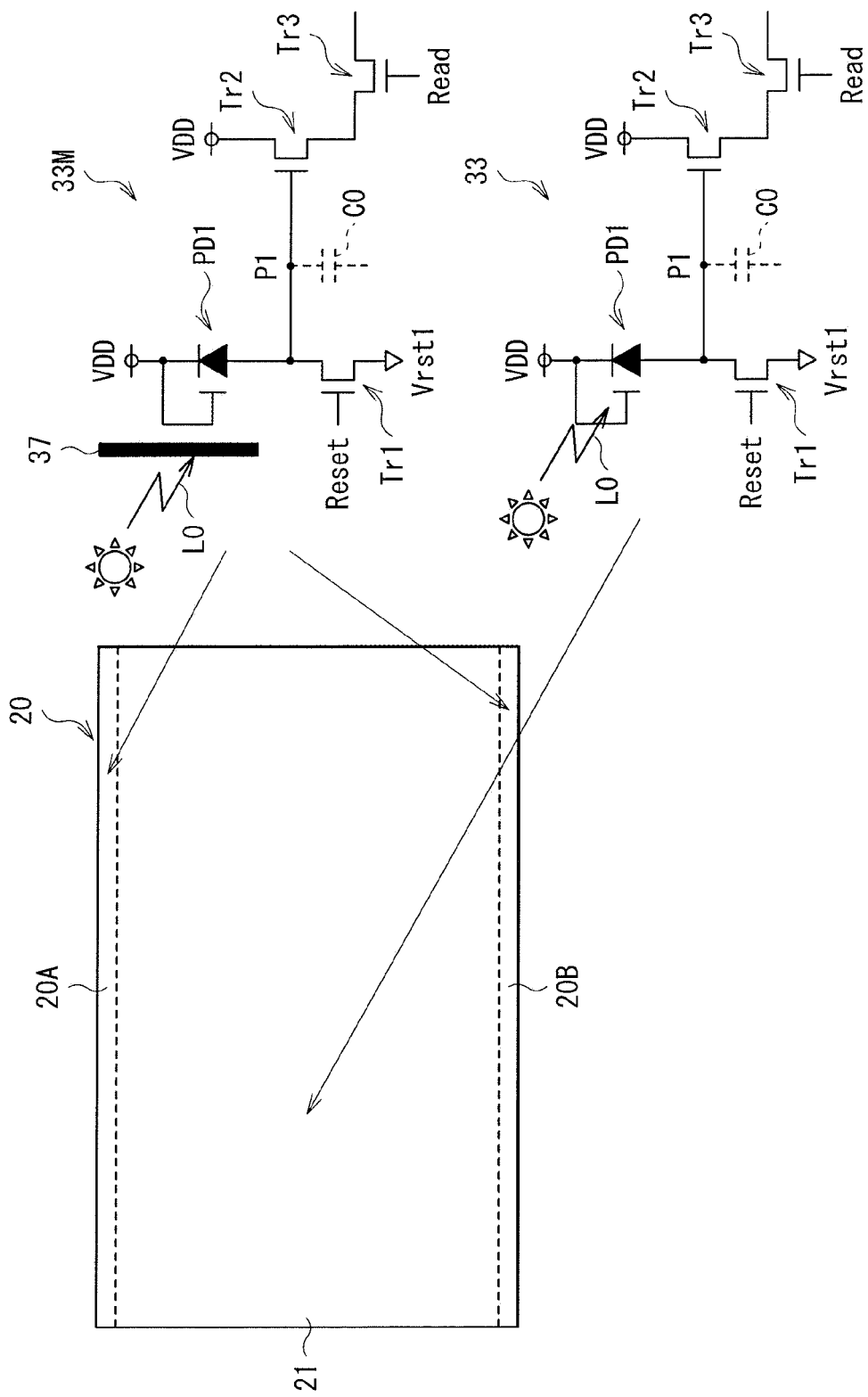
FIG. 6 is an explanatory diagram for a placement position of a monitor sensor.

FIG. 6 illustrates a placement position and a circuit configuration of the monitor sensor 33M. In the reset-voltage control section 16, the monitor sensor 33M is provided to monitor the temperature so that the value of the reset voltage Vrst1 of the monitor sensor 33M is variably controlled according to the temperature. In the I/O display panel 20, at least one monitor sensor 33M is disposed in the area different from the display area (sensor area) 21 where the sensor elements 33 are disposed. For example, the monitor sensor 33M is disposed in at least one of a panel upper part 20A and a panel lower part 20B.

As the circuit configuration, the monitor sensor 33M has the same structure as that of the sensor element 33. In other words, like the sensor element 33, the monitor sensor 33M includes a photoelectric conversion element PD1, a storage node P1, a reset transistor Tr1, an amplification transistor Tr2 and a select/read transistor Tr3. However, in order to monitor an influence of a change in the characteristic (change in a dark current) of the photoelectric conversion element PD1 due to the temperature, the monitor sensor 33M is configured to be shielded from external light L0 by a shielding body 37.

Figure 7:
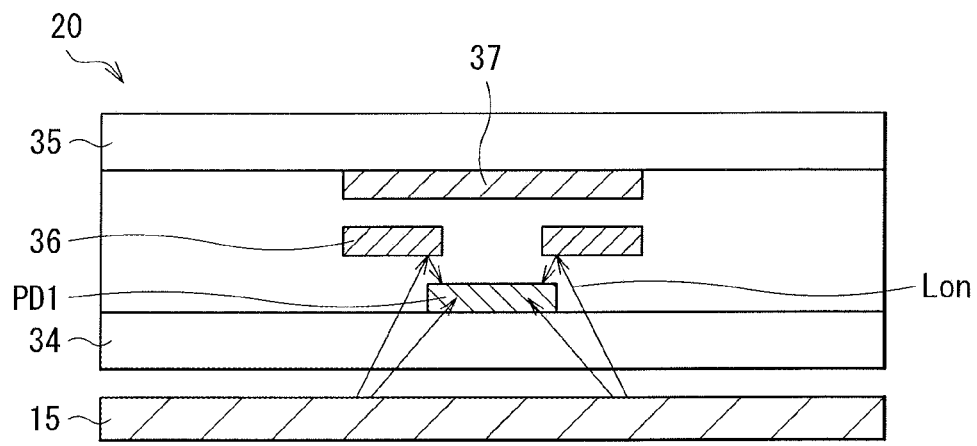
FIG. 7 is a cross-sectional diagram that illustrates the structure of a part where the monitor sensor is disposed.

FIG. 7 illustrates a cross-sectional structure of a part where the monitor sensor 33M is disposed. The I/O display panel 20 includes a pixel substrate 34 and a facing substrate 35 arranged in this order from the backlight 15 side. On the pixel substrate 34, the sensor element 33, the monitor sensor 33M and the like are formed. For example, on the pixel substrate 34, the photoelectric conversion element PD1 is disposed, and a wiring section 36 for driving and controlling the sensor element 33 and the monitor sensor 33M is disposed above the photoelectric conversion element PD1. The shielding body 37 is formed on an inner-surface side of the facing substrate 35, and shields the photoelectric conversion element PD1 from the outside. As apparent from FIG. 7, the monitor sensor 33M is shielded from the external light L0, but the illuminating light Lon emitted by the backlight 15 comes in. Thus, concerning the incident light, the monitor sensor 33M is equivalent to the sensor element 33 in terms of conditions other than the external light L0.

Configurational Example of Reset-Voltage Control Section 16

Figure 8:
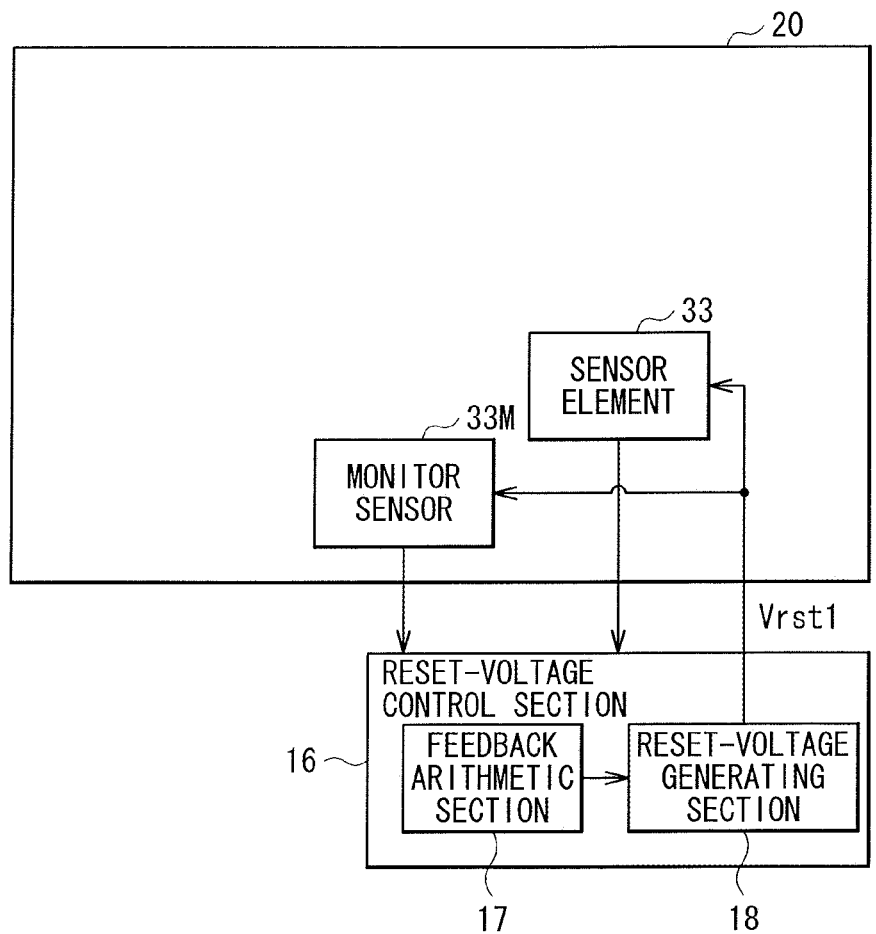
FIG. 8 is a block diagram that functionally illustrates a circuit related to variable control of a reset voltage.

FIG. 8 functionally illustrates a circuit related to variable control of the reset voltage Vrst1. The reset-voltage control section 16 includes a feedback arithmetic section 17 and a reset-voltage generating section 18. The reset-voltage control section 16 is configured to obtain, from the monitor sensor 33M, a voltage value corresponding to charging voltage of the storage node P1 resulting from the dark current occurring in the photoelectric conversion element PD1. Further, the reset-voltage control section 16 is configured to perform, according to the obtained voltage value, the variable control of the reset voltage Vrst1 in the sensor element 33 and the monitor sensor 33M.

Figure 9:
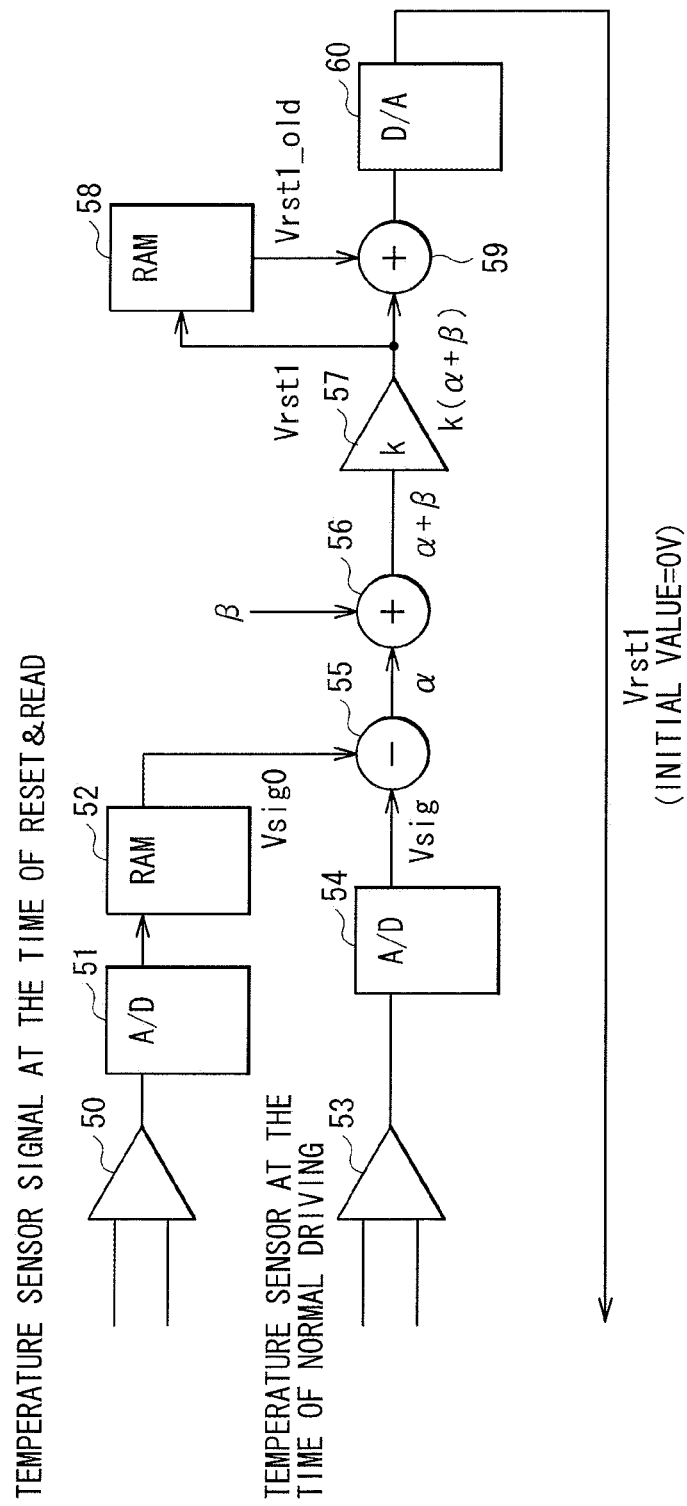
FIG. 9 is a circuit diagram that illustrates a specific circuit configuration example of a reset-voltage control section.

FIG. 9 illustrates a specific circuit configuration example of the reset-voltage control section 16. This specific circuit configuration example in FIG. 9 is an example to realize the variable control of the reset voltage represented by a flow illustrated in FIG. 16, which will be described later. The reset-voltage control section 16 includes an amplifier 50, an analog-to-digital (A/D) converter 51, a Random Access Memory (RAM) 52, an amplifier 53, and an A/D converter 54. The reset-voltage control section 16 further includes a difference device 55, an adder 56, a multiplier 57, a RAM 58, an adder 59, and a D/A converter 60.

Operation of Display Device

First, a summary of image display operation and object detection operation (image pickup operation) by this display device will be described.

In this display device, based on display data supplied by the application-program executing section 11, the display drive circuit 12 generates a drive signal for display. Based on this drive signal, the I/O display panel 20 is line-sequentially driven, and an image is displayed. At this time, the backlight 15 also is driven by the display drive circuit 12, so that operation for turning on and off the backlight 15 is periodically performed in synchronization with the I/O display panel 20.

When there is an object (a nearby object such as a finger) touching or close to the I/O display panel 20, the object is detected (imaged) by the sensor elements 33 in the I/O display panel 20 through linear sequential image-pickup driving by the light-receiving drive circuit 13. A detection signal (image pickup signal) from each of the sensor elements 33 is supplied from the I/O display panel 20 to the light-receiving drive circuit 13. The light-receiving drive circuit 13 accumulates the detection signals of the sensor elements 33 for one frame and outputs the accumulated detection signals to the image processing section 14 as a picked-up image. Here, two frame images are output to the image processing section 14, namely, an image based on the sensor detection signals from the sensor elements 33 obtained when the backlight 15 is in the ON state, and an image based the sensor detection signals from the sensor elements 33 obtained when the backlight 15 is in the OFF state.

The image processing section 14 obtains object information about the object (such as positional coordinates data and data related to the shape and size of the object) touching or close to the I/O display panel 20, by performing predetermined image processing (arithmetic processing) based on this picked-up image. For example, the arithmetic processing to determine a barycenter of a differential image produced in the light-receiving drive circuit 13 is performed, and a contact (approach) center is identified. Subsequently, a result of detecting the nearby object is output from the image processing section 14 to the application-program executing section 11. The application-program executing section 11 executes an application program as will be described later.

Details of Sensor Operation

Figure 10:
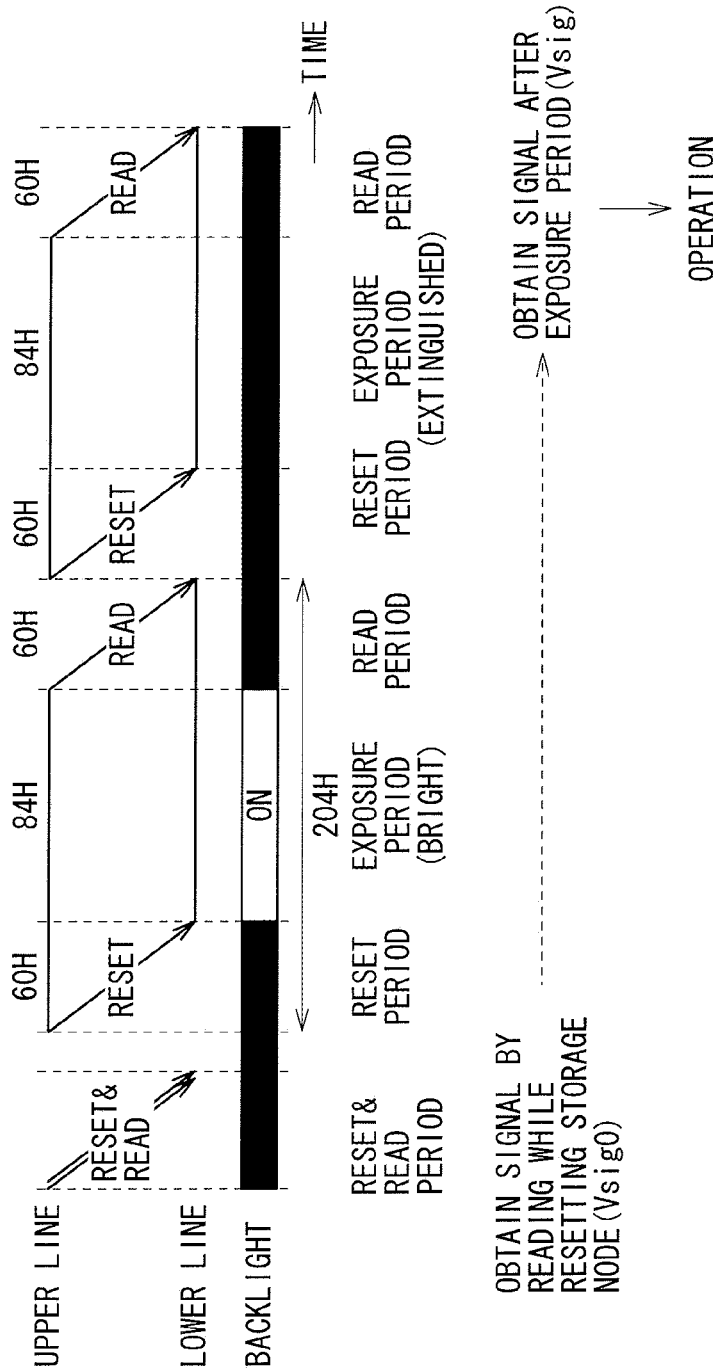
FIG. 10 is a timing waveform diagram that represents an example of sensor operation (image pickup operation) in the display device illustrated in FIG. 1.

FIG. 10 illustrates an example of sensor operation (image pickup operation) in this display device. Each arrow extending from top to bottom illustrated in an upper part of FIG. 10 schematically shows driving timing of the sensor element 33 and the monitor sensor 33M in the I/O display panel 20. A lateral direction corresponds to time, while a vertical direction corresponds to a scanning line of the I/O display panel 20. In a lower part of this driving timing chart, the on-off state of the backlight 15 is schematically illustrated. In the part showing the on-off state of the backlight 15, black portions indicate that the backlight 15 is off. In a lower part of FIG. 10, signal acquisition timing used in the variable control of the reset voltage Vrst1 that will be described later is schematically illustrated. Incidentally, in FIG. 10, "H" corresponds to an image-pickup (detection) period for one horizontal line. This example shows a case where the sensor elements 33 and the monitor sensor 33M are provided for 60 lines in a vertical direction. Therefore, for example, 60H corresponds to a period during which line-sequential imaging (detection) for one screen is performed.

First, in an initial state, there is performed such processing that the voltage value of the storage node P1 in each of the sensor elements 33 and the monitor sensor 33M is reset with a predetermined reference reset voltage (Vrst1=0(V)) and the voltage value of the storage node P1 is read out as the sensor detection signal (Reset and Read period). This processing is performed sequentially from upper to lower lines of the I/O display panel 20.

Next, sequentially from upper to lower lines, there is performed processing of resetting the voltage value of the storage node P1 in each of the sensor elements 33 and the monitor sensor 33M with the reset voltage Vrst1 (Reset period). Subsequently, in a state in which the backlight 15 is on, exposure (storage of electric charge converted by the photoelectric conversion element PD1 in the storage node P1) is performed (exposure period (bright)). Subsequently, from upper to lower lines sequentially, there is performed processing of reading the voltage value of the storage node P1 in each of the sensor elements 33 and the monitor sensor 33M as the sensor detection signal (Read period).

Next, again, sequentially from upper to lower lines, there is performed the processing of resetting the voltage value of the storage node P1 in each of the sensor elements 33 and the monitor sensor 33M with the reset voltage Vrst1 (Reset period). Subsequently, in a state in which the backlight 15 is off, exposure (storage of electric charge converted by the photoelectric conversion element PD1 in the storage node P1) is performed (exposure period (extinguished)). Afterwards, from upper to lower lines sequentially, there is performed the processing of reading the voltage value of the storage node P1 in each of the sensor elements 33 and the monitor sensor 33M as the sensor detection signal (Read period).

As described above, there are performed the exposure in the state in which the backlight 15 is on and the exposure in the state in which the backlight 15 is off, while the Reset period provided in between, and the processing of reading the sensor detection signals in each state is performed. Afterwards, this series of processing is sequentially repeated. Incidentally, the Reset and Read period is provided each time a series of the Reset period, the exposure period and the Read period is repeated a predetermined number of times.

Specific Example of Detection of Nearby Object

FIG. 11A illustrates a state in which a nearby object (finger f) is in the sensor area 21 of the I/O display panel 20 when there is strong external light L0, and FIG. 11B illustrates an example of a sensor output voltage (received-light output voltage) in such a state. For example, when incident external light (ambient light) L0 is strong as illustrated in FIG. 11A, a received-light output voltage Von101 in a state in which the backlight 15 is on is as illustrated in FIG. 11B. In other words, the received-light output voltage Von101 is a voltage value Va corresponding almost only to the intensity of the ambient light L0 in any part other than a part touched by the finger f within the sensor area 21 on the panel. Further, at the part touched by the finger f, the received-light output voltage Von101 is reduced to a voltage value Vb corresponding to the intensity of the illuminating light Lon emitted from the backlight 15 and reflected off a surface of the finger f. In contrast, a received-light output voltage Voff101 in a state in which the backlight 15 is off is, similarly, the voltage value Va according to the intensity of the ambient light L0 in the part other than the part touched by the finger f, but at the part touched by the finger f, the ambient light L0 is almost blocked and thus, the received-light output voltage Voff101 is a voltage value Vc at an extremely low level.

FIG. 12A illustrates a state in which a nearby object (finger f) is in the sensor area 21 of the I/O display panel 20 when the external light L0 is weak, and FIG. 12B illustrates an example of the sensor output voltage (received-light output voltage) in such a state. For example, in a state in which the incident ambient light L0 is weak (almost absent) as illustrated in FIG. 12A, a received-light output voltage Von201 in the state in which the backlight 15 is on is as illustrated in FIG. 12B. In other words, in any part other than the part touched by the finger f within the sensor area 21, the received-light output voltage Von201 is the voltage value Vc at the extremely low level because the ambient light L0 is weak. Moreover, at the part touched by the finger f in the sensor area 21, the received-light output voltage Von201 is increased to the voltage value Vb corresponding to the intensity of the illuminating light Lon emitted from the backlight 15 and reflected off the surface of the finger f. In contrast, at both of the part touched by the finger f and the other part, a received-light output voltage Voff201 in the state in which the backlight 15 is off remains unchanged at the voltage value Vc at an extremely low level.

Thus, at the part untouched by the finger f in the sensor area 21, there is a great difference in terms of received-light output voltage between when the ambient light L0 is present and when the ambient light L0 is absent. In contrast, at the part touched by the finger f in the sensor area 21, the voltage value Vb at the time when the backlight 15 is on and the voltage value Vc at the time when the backlight 15 is off are approximately constant regardless of the presence or absence of the ambient light L0. Therefore, by detecting a difference between a voltage at the time when the backlight 15 is on and a voltage at the time when the backlight 15 is off, it is possible to determine that a part, in which there is a difference not lower than a certain level such as the difference between the voltage value Vb and the voltage value Vc, is a part where there is an approach or the like of an object.

Figure 13:
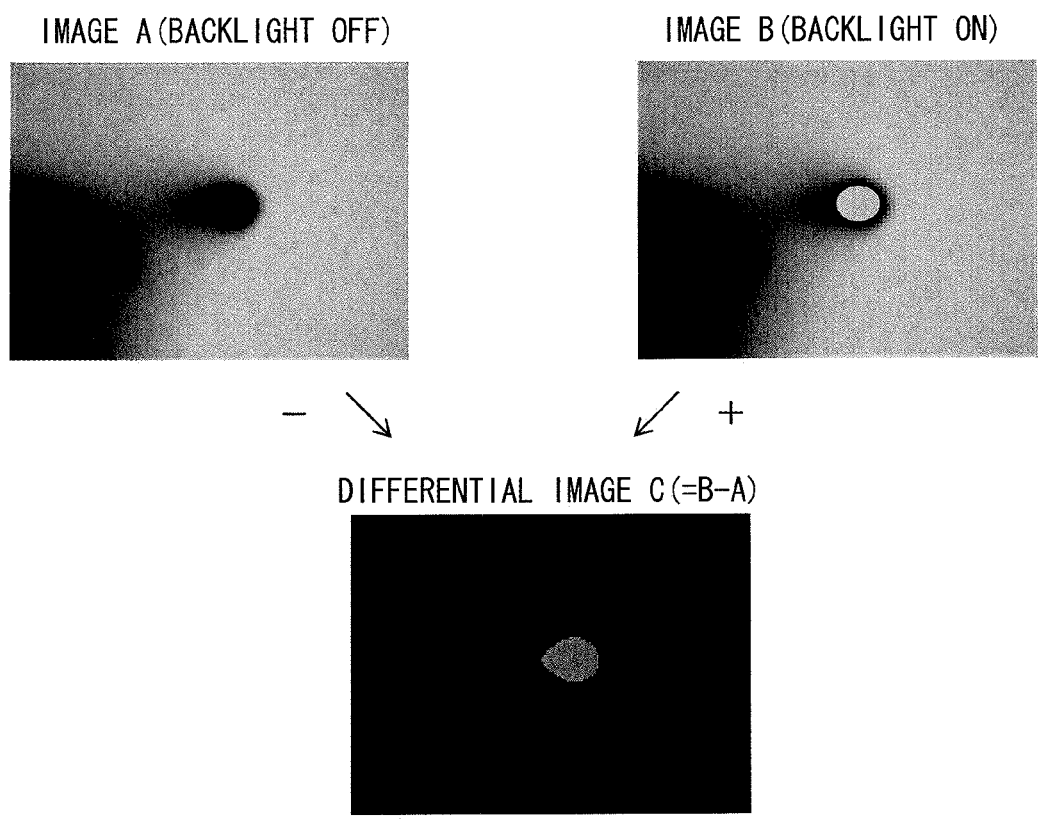
FIG. 13 is a diagram that shows images for describing a method of detecting a nearby object by using a differential image.

In the image processing section 14 (FIG. 1), for example, a differential image C as illustrated in FIG. 13 is obtained. An image B is an example of the image based on the sensor detection signals from the sensor elements 33 obtained in a state in which the illuminating light Lon is emitted by the backlight 15. An image A is an example of the image based on the sensor detection signals from the sensor elements 33 obtained in a state in which the illuminating light Lon is not emitted by the backlight 15. It is possible to detect the position and the like of an object based on the differential image C between the image A and the image B.

Characteristic Change Due to Temperature

Figure 14:
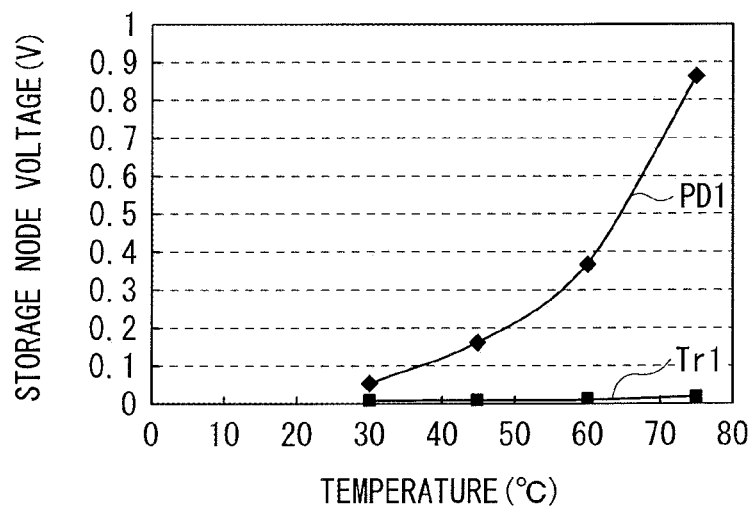
FIG. 14 is a graph that illustrates a characteristic showing a change in the voltage of a storage node due a temperature rise in the sensor element.

FIG. 14 illustrates a change in the voltage of the storage node P1 with a temperature rise in the sensor element 33. Incidentally, FIG. 14 shows a characteristic in a state in which incident light is absent in the sensor element 33 (dark state). A horizontal axis indicates the temperature while a vertical axis indicates the voltage of the storage node P1. FIG. 14 illustrates a change in the voltage of the storage node P1 when there is a temperature rise in the photoelectric conversion element PD1 and a change in the voltage of the storage node P1 when there is a temperature rise in the reset transistor Tr1. As apparent from FIG. 14, the temperature rise in the photoelectric conversion element PD1 affects the voltage of the storage node P1. On the other hand, the temperature rise in the reset transistor Tr1 has almost no influence on the voltage of the storage node P1.

Figure 15:
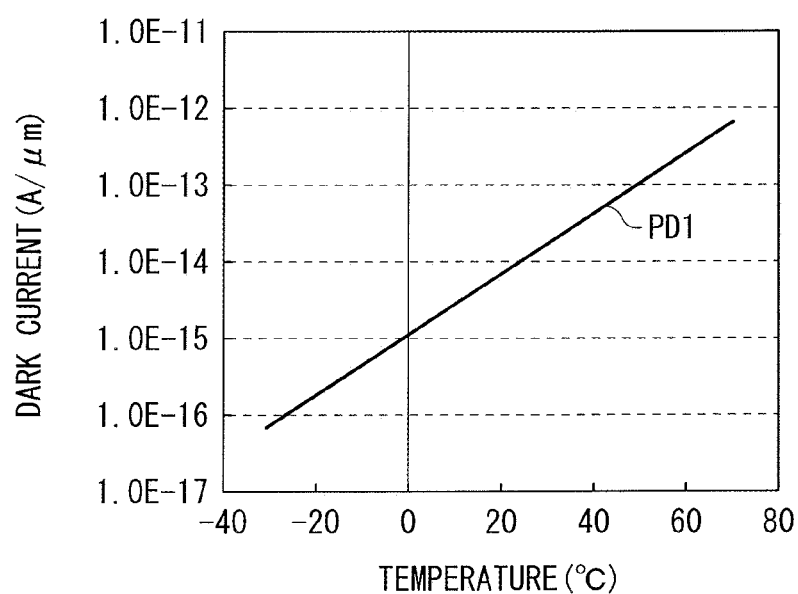
FIG. 15 is a graph that illustrates a temperature characteristic of a photoelectric conversion element alone.

FIG. 15 shows a temperature characteristic of the photoelectric conversion element PD1 alone. Incidentally, FIG. 15 shows the characteristic in a state in which incident light is absent in the photoelectric conversion element PD1 (dark state). In other words, FIG. 15 shows a temperature characteristic of the dark current in the photoelectric conversion element PD1. As illustrated in FIG. 15, the dark current (thermal excitation current) flows in the photoelectric conversion element PD1 even in a state of no incident light. This dark current has such a characteristic that the dark current changes with temperature and the amount of flowing current increases as the temperature rises. Because this dark current is present, the change in the voltage of the storage node P1 due to the temperature as illustrated in FIG. 14 takes places. In particular, when the temperature becomes high, an influence of the dark current becomes large, increasing the voltage of the storage node P1 and thus leading to a saturated state of the storage node P1, which may adversely affect the detection operation for serving as the sensor. In the present embodiment, in order to reduce the influence of the dark current accompanying the temperature change, the voltage value corresponding to the charging voltage of the storage node P1 due to the dark current is obtained by using the monitor sensor 33M, and the variable control of the reset voltage Vrst1 is performed based on the obtained voltage value as described below.

Specific Example of Control Operation by Reset-Voltage Control Section 16

Figure 16:
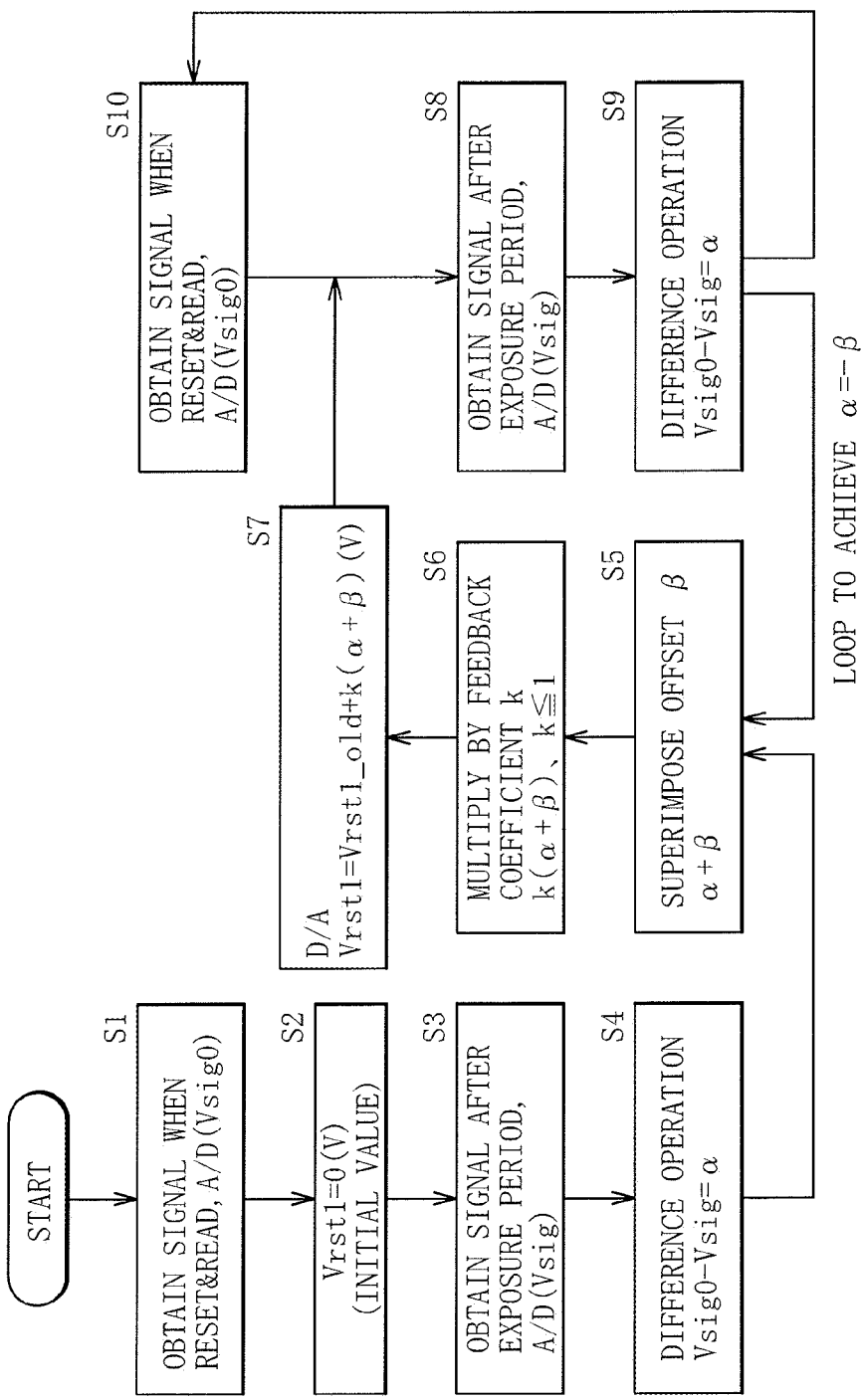
FIG. 16 is an explanatory diagram that illustrates a flow of variable control of the reset voltage.

FIG. 16 illustrates the flow representing the variable control of the reset voltage Vrst1 realized by the circuit illustrated in FIG. 8 and FIG. 9. The reset-voltage control section 16 assumes, in the monitor sensor 33M, a reference voltage value of the sensor detection signal read out during the period in which the voltage value of the storage node P1 is reset with the predetermined reference reset voltage (Vrst1=0(V)) to be Vsig0 (steps S1 and S2). In the circuit of FIG. 9, these steps correspond to the processing by the amplifier 50, the A/D converter 51 and the RAM 52.

Further, subsequent to resetting of the voltage value of the storage node P1 by the reset transistor Tr1, the voltage value of the sensor detection signal read out after a lapse of a predetermined exposure period is assumed to be Vsig (step S3). In the circuit of FIG. 9, this step corresponds to the processing by the amplifier 53 and the A/D converter 54. It is desirable that the voltage value Vsig be a value read out after a lapse of the exposure period (exposure period (extinguished) in FIG. 10) in the state in which the illuminating light is not emitted by the backlight 15.

Subsequently, a difference a represented by Vsig0−Vsig=α is determined as a voltage value corresponding to the charging voltage of the storage node P1 due to the dark current (step S4). In the circuit of FIG. 9, this step corresponds to the processing by the difference device 55. Incidentally, when there are two or more monitor sensors 33M, there may be performed, for example, such a process that an average value of differences α determined based on the respective monitor sensors 33M is taken, and this average value is used as the difference α in post processing.

Next, the reset-voltage control section 16 superimposes a predetermined offset value β on the difference α and multiplies by a predetermined coefficient k of 1 or less, so that a value k(α+β) is determined (steps S5 and S6). In the circuit of FIG. 9, this step corresponds to the processing by the adder 56 and the multiplier 57. The coefficient k is provided to make a response to a change smaller (to prevent an abrupt change of the reset voltage Vrst1 from occurring). The coefficient k is set at, for example, around 0.25. β is set at, for example, a value of around −1.5-0.

Subsequently, the reset voltage Vrst1 immediately before is assumed to be (Vrst1_old) and added to the value k(α+β), so that the following value is determined.

$$Vrst1 = Vrst1\_old + k(\alpha+\beta)$$

This value is output as a new reset voltage Vrst1 (step S7). In the circuit of FIG. 9, this step corresponds to the processing by the RAM 58, the adder 59 and the D/A converter 60.

Subsequently, there is performed such processing that the voltage value Vsig of the sensor detection signal after the resetting with the new reset voltage Vrst1 is obtained, and the difference α is determined again (steps S8 and S9). And then, a loop of repeating the processing from step S5 to S7 is performed. By repeating this loop, the control is performed so that the difference α falls within a range of a predetermined offset value −β. In other words, the control is performed so that the voltage of the storage node becomes −β. Further, each time a predetermined number of loops are repeated, in a manner similar to step S1, the processing of obtaining the reference voltage value Vsig0 is performed again (step S10). By doing so, it is possible to deal with a change of the reference voltage value Vsig0 due to a change in temperature.

In this way, the reset-voltage control section 16 performs feedback control in which the predetermined offset value β is superimposed on the difference α and multiplied by the predetermined coefficient k of 1 or less so that the value k(α+β) is determined, and the value k(α+β) is reflected on the reset voltage Vrst1 in each of the sensor elements 33 and the monitor sensor 33M. As a result, the control is performed so that the voltage value Vsig of the sensor detection signal in the monitor sensor 33M falls within the range of the predetermined offset value β.

Figure 17:
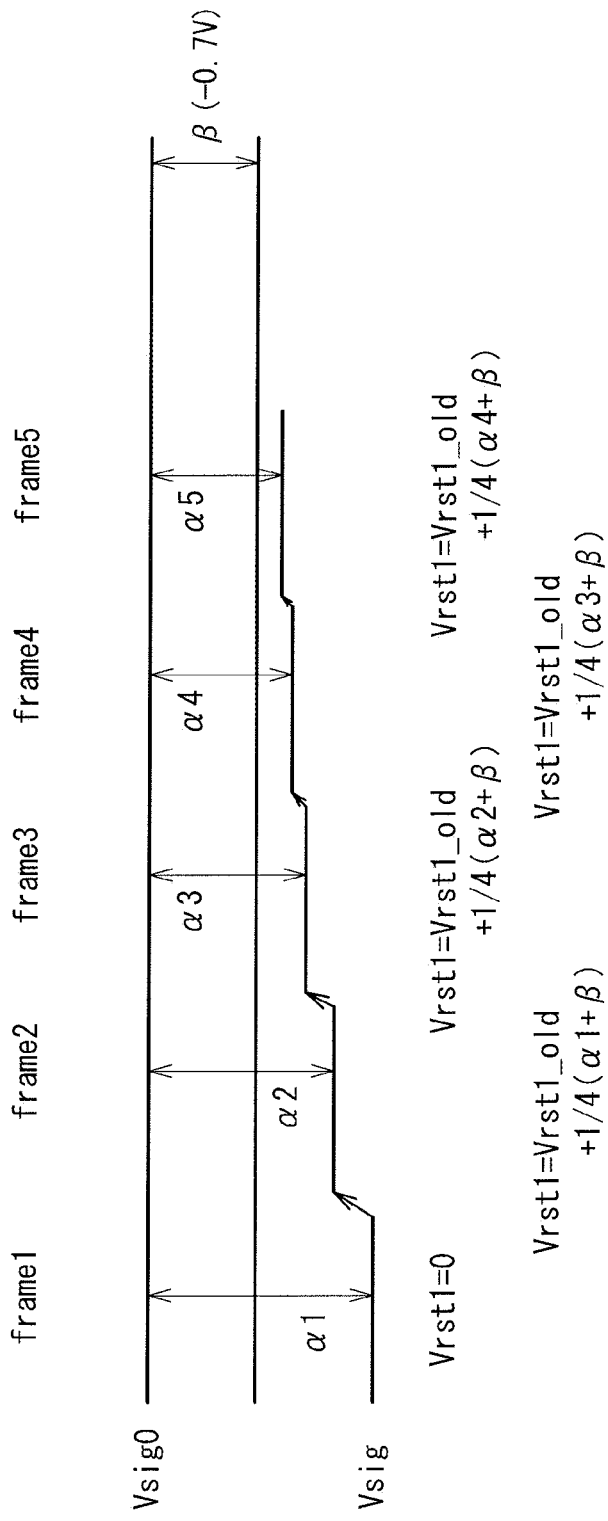
FIG. 17 is an explanatory diagram that illustrates an example in which the variable control of the reset voltage illustrated in FIG. 16 is performed when the temperature is lower than a reference temperature.
Figure 18:
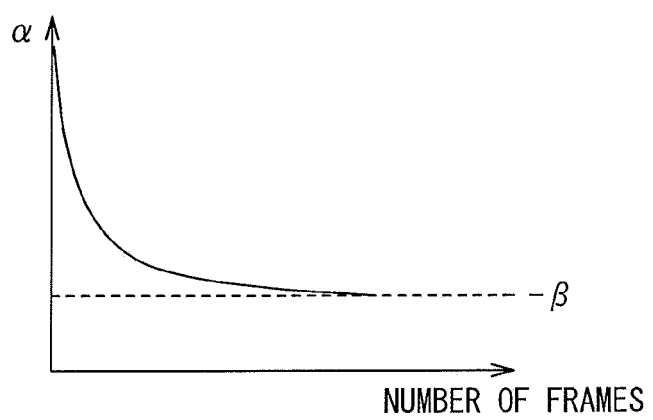
FIG. 18 is an explanatory diagram that illustrates a state in which when the variable control of the reset voltage illustrated in FIG. 16 is performed in a case where the temperature is lower than the reference temperature, difference values α of sensor output voltages converge on a predetermined offset value −β.

FIG. 17 illustrates an example in which the variable control of the reset voltage Vrst1 illustrated in FIG. 16 is performed when the temperature is lower than a reference temperature. FIG. 18 illustrates a state in which when the variable control of the reset voltage Vrst1 illustrated in FIG. 16 is performed in the state in which the temperature is lower than the reference temperature, the difference values α of the sensor output voltages converge on the predetermined offset value −β. Incidentally, in FIG. 17 and FIG. 18, a horizontal axis represents a lapse of time in units of the number of frames. The number of frames here means that in the flow illustrated in FIG. 16, the detection signals (image-pickup frame) obtained after a lapse of a first exposure period is assumed to be a frame1, and the detection signals (image-pickup frame) obtained after a lapse of an Nth (N is an integer of 2 or more) exposure period is assumed to be a frameN.

Figure 19:
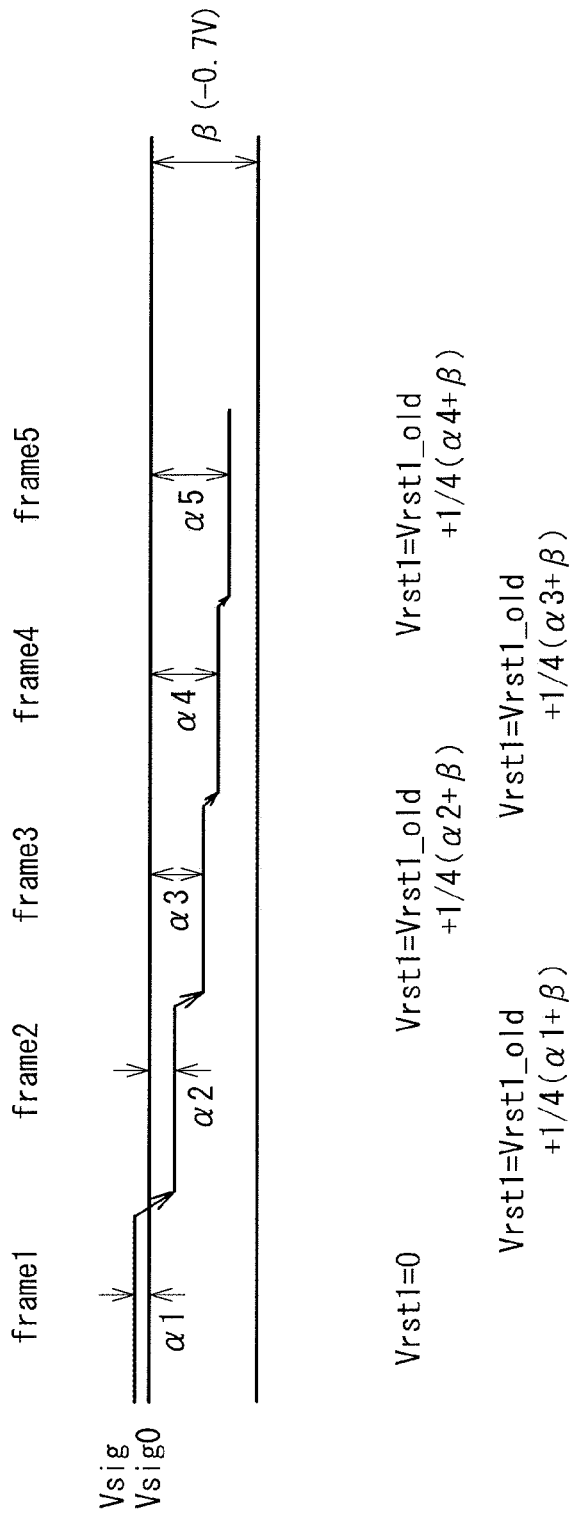
FIG. 19 is an explanatory diagram that illustrates an example in which the variable control of the reset voltage illustrated in FIG. 16 is performed when the temperature is higher than the reference temperature.
Figure 20:
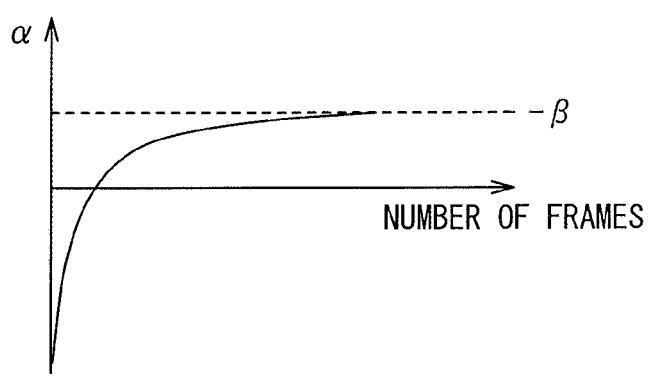
FIG. 20 is an explanatory diagram that illustrates a state in which when the variable control of the reset voltage illustrated in FIG. 16 is performed in a case where the temperature is higher than the reference temperature, difference values α of sensor output voltages converge on the predetermined offset value −β.

FIG. 19 illustrates an example in which the variable control of the reset voltage Vrst1 illustrated in FIG. 16 is performed when the temperature is higher than the reference temperature. FIG. 20 illustrates a state in which when the variable control of the reset voltage illustrated in FIG. 16 is performed in the state in which the temperature is higher than the reference temperature, the difference values α of the sensor output voltages converge on the predetermined offset value −β. In FIG. 19 and FIG. 20, a horizontal axis represents a lapse of time in units of the number of frames.

In this way, according to the display device with the input function in the present embodiment, the reset voltage value Vrst1 for resetting the voltage value of the storage node P1 in the sensor element 33 is variably controlled according to the characteristic change of the photoelectric conversion element due to the temperature and thus, it is possible to perform stable detection operation by reducing the influence of the dark current accompanying a change in temperature.

Incidentally, the illuminating light Lon emitted by the backlight 15 and received by the photoelectric conversion element PD1 includes not only the light reflected from a nearby object but a component entering directly upon the photoelectric conversion element PD1 and further a component enters due to internal reflection within the panel. There is such an issue that the component of the light directly coming in from the backlight 15 or the component of the internally reflected light is stored in the storage node P1. By performing the variable control of the reset voltage Vrst1, it is possible to reduce an influence of charging voltage resulting from the directly incoming light or the internally reflected light. Further, there is such an issue that in the sensor element 33, when the reset voltage Vrst1 is given, a voltage drop occurs in the storage node P1 due to capacitive coupling among elements and wirings. By performing the variable control of the reset voltage Vrst1, it is also possible to reduce an influence of charging voltage resulting from this voltage drop.

Examples of Executing Application Program

Next, with reference to FIG. 21A through FIG. 24, there will be described some examples of executing an application program by the application-program executing section 11, in which the positional information and the like of the object detected by the nearby-object detection processing described above are used.

Figure 21A:
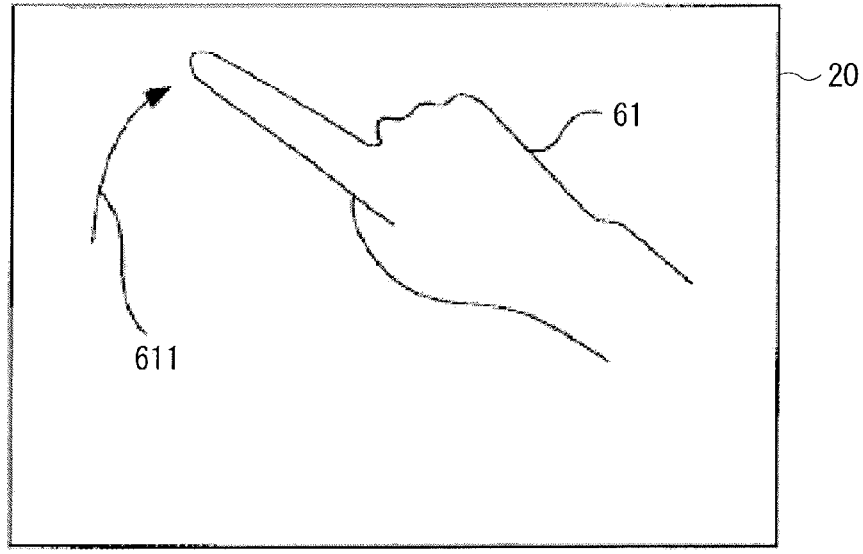
FIGS. 21A and 21B are explanatory diagrams that illustrate a first example and a second example, respectively, of executing an application program by using a result of nearby-object detection processing in the display device illustrated in FIG. 1.

A first example illustrated in FIG. 21A is an example in which the surface of the I/O display panel 20 is touched by a finger tip 61, and a trail of touched points is displayed on the surface as a drawn line 611.

Figure 21B:
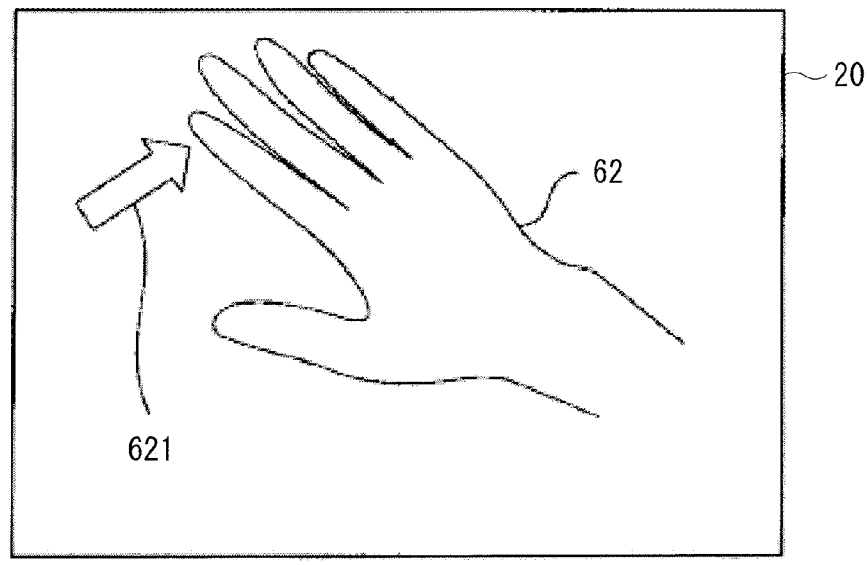

A second example illustrated in FIG. 21B is an example in which a gesture is recognized by using the shape of a hand. Specifically, the shape of a hand 62 touching (or near) the I/O display panel 20 is recognized, the recognized shape of the hand is displayed as a displayed object, and a movement 621 of the displayed object is used to carry out some processing.

Figure 22:
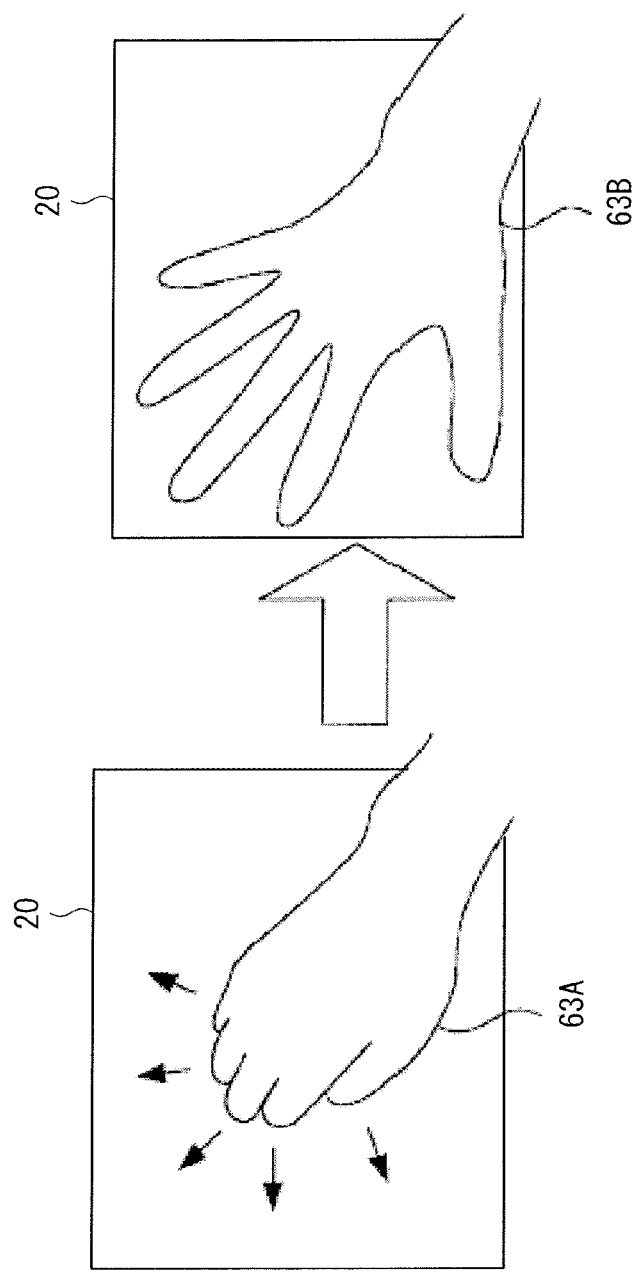
FIG. 22 is an explanatory diagram that illustrates a third example of executing an application program by using a result of the nearby-object detection processing.

A third example illustrated in FIG. 22 is an example in which a closed hand 63A is changed to an open hand 63B, image recognition of a touch or an approach of each hand is performed by the I/O display panel 20, and processing based on the image recognition is executed. Through the processing based on the image recognition, it is possible to give a direction such as zooming in. In addition, since it is possible to give such a direction, when, for example, the I/O display panel 20 is connected to a personal computer, input through manipulation of switching commands on the personal computer may be replaced by input through the image recognition and thus, directions may be input more naturally.

Figure 23:
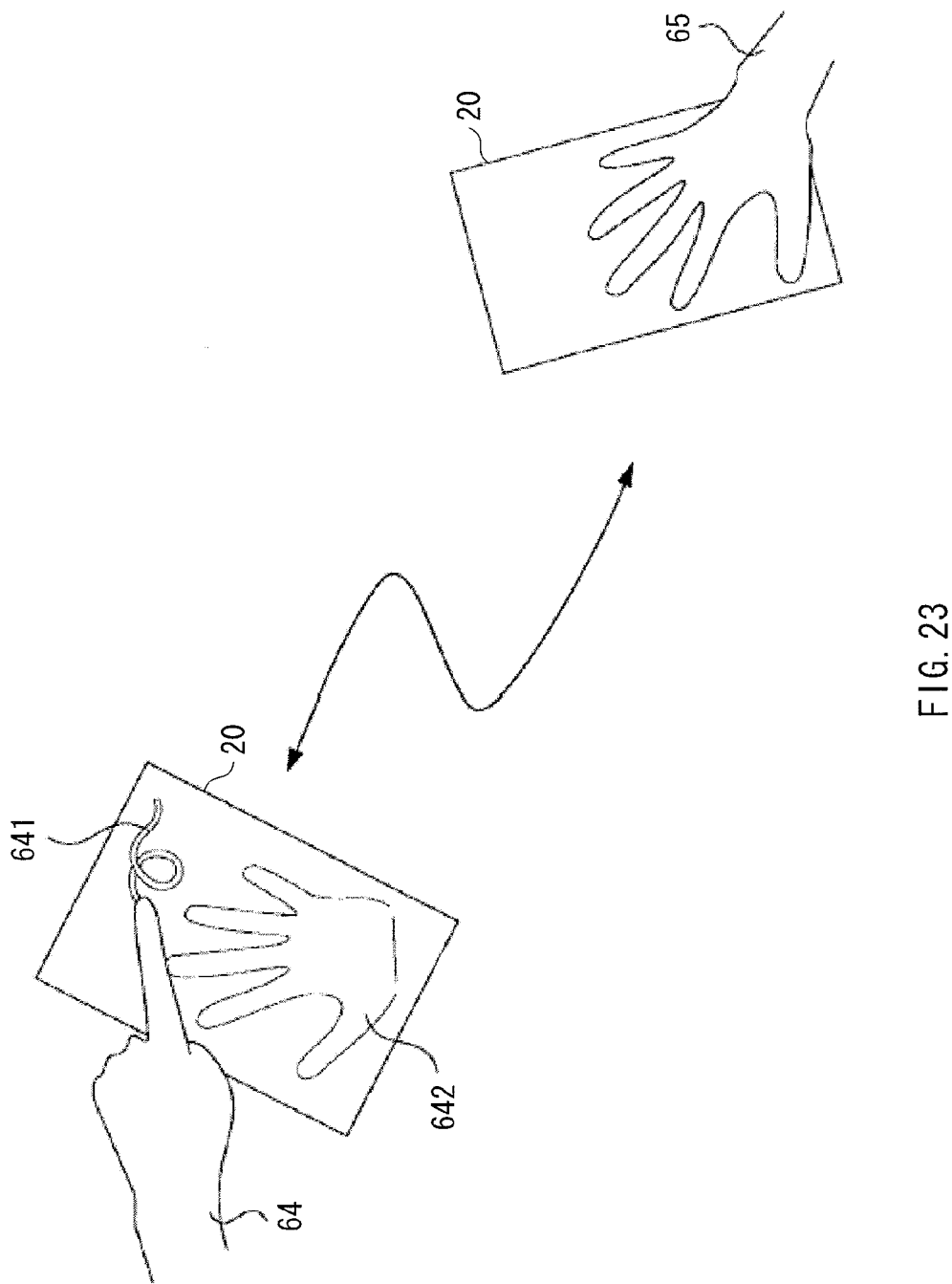
FIG. 23 is an explanatory diagram that illustrates a fourth example of executing an application program by using a result of the nearby-object detection processing.

A fourth example illustrated in FIG. 23 is an example in which two I/O display panels 20 are prepared and connected to each other by some transmission means. In this structure, an image obtained by detecting a touch on or an approach to one of the I/O display panels 20 may be transmitted to and then displayed by the other of the I/O display panels 20, and users operating the respective I/O display panels 20 may communicate with each other. For example, as illustrated in FIG. 23, it is possible to perform such processing that one of the I/O display panels 20 is caused to obtain an image of the shape of a hand 65 through image recognition and transmit the obtained image to the other of the I/O display panels 20 that in tern is caused to display a hand shape 642 identical to the shape of the hand 65. It is also possible to perform processing such as causing a trail 641 displayed as a result of a touch by a hand 64 on the other of the I/O display panels 20 to be transmitted to and then displayed by the one of the I/O display panels 20. In this way, a state of drawing is transmitted as a moving image and handwritten characters or graphics are sent to a counterpart, which creates a possibility that the I/O display panel 20 may become a new communication tool. For instance, the I/O display panel 20 may be applied to a display panel of a portable telephone. Incidentally, FIG. 23 illustrates the example in which the two I/O display panels 20 are prepared, but it is possible to perform similar processing by connecting three or more I/O display panels 20 to one another with a transmission means.

Figure 24:
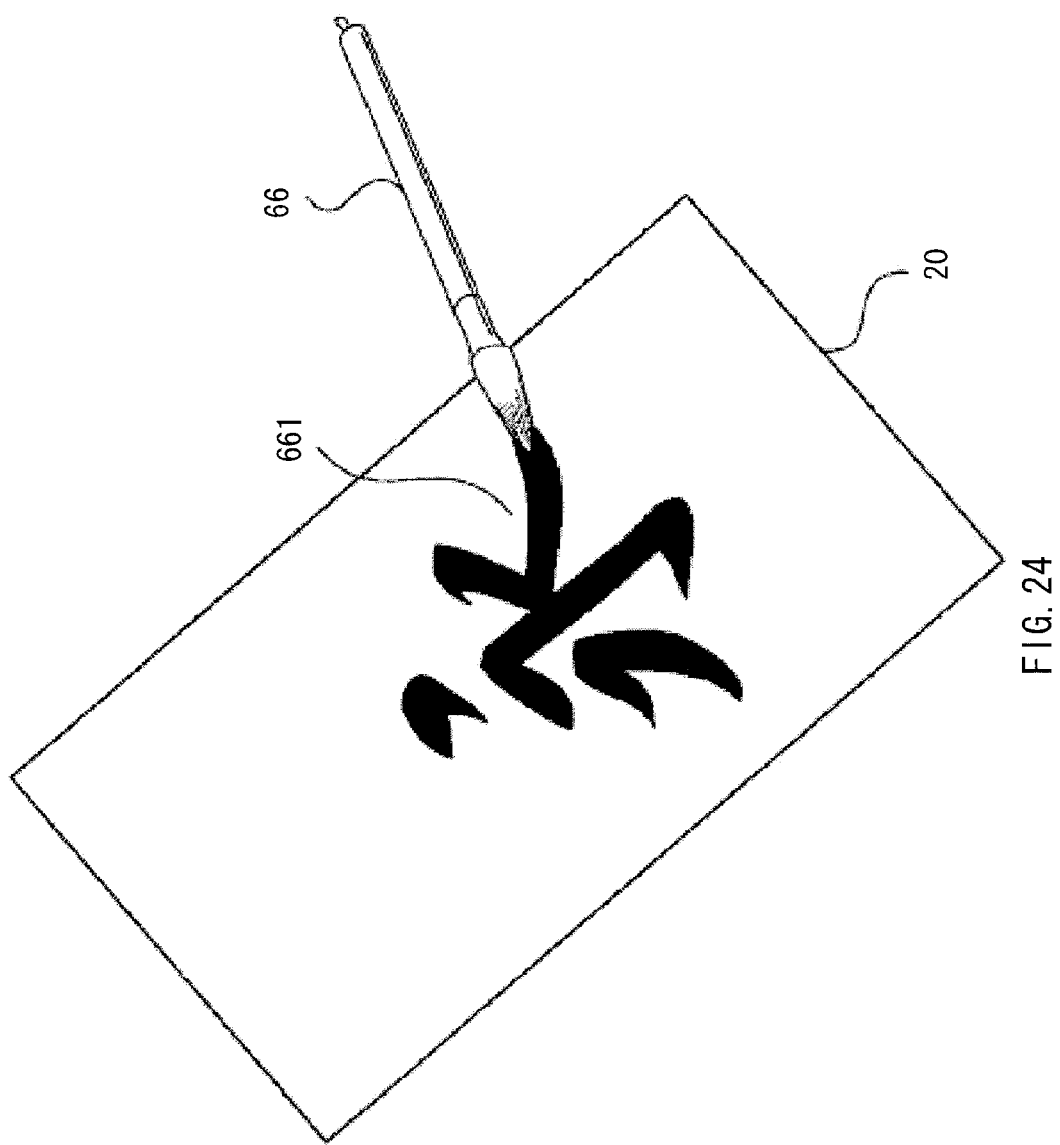
FIG. 24 is an explanatory diagram that illustrates a fifth example of executing an application program by using a result of the nearby-object detection processing.

Further, as illustrated in a fifth example of FIG. 24, a writing brush 66 is used to write a character on the surface of the I/O display panel 20 by being caused to touch the surface of the I/O display panel 20, and points touched by the writing brush 66 are displayed as an image 661 on the I/O display panel 20 and thus, input of handwriting by the writing brush is made possible. In this case, it is possible to recognize and realize even faint touches of the writing brush. In a case of recognition of handwriting in the past, for example, inclinations of a special pen are realized by electric-field detection in some digitizer. However, in the present example, a surface touched by the real writing brush is detected and thus, information is input with a more realistic feeling.

MODULE AND APPLICATION EXAMPLES

Next, with reference to FIG. 25 through FIG. 29G, there will be described application examples of the display device with the input function described above. This display device is applicable to electronic apparatuses in all fields, which display externally-input video signals or internally-generated video signals as still or moving images. For example, the display device is applicable to electronic apparatuses such as television receivers, digital cameras, laptop computers, portable terminal devices such as portable telephones, and video cameras.

Application Example 1

Figure 25:
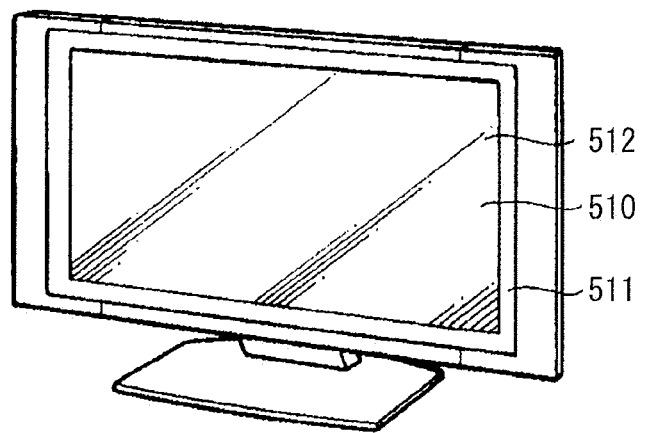
FIG. 25 is an external perspective view of a first application example of the display device illustrated in FIG. 1.

FIG. 25 illustrates an external view of a television receiver serving as a first example of the electronic apparatuses. This television receiver has, for example, a video display screen section 510 that includes a front panel 511 and a filter glass 512. The display device with the input function described above is applicable to the video display screen section 510 of this television receiver.

Application Example 2

Figure 26A:
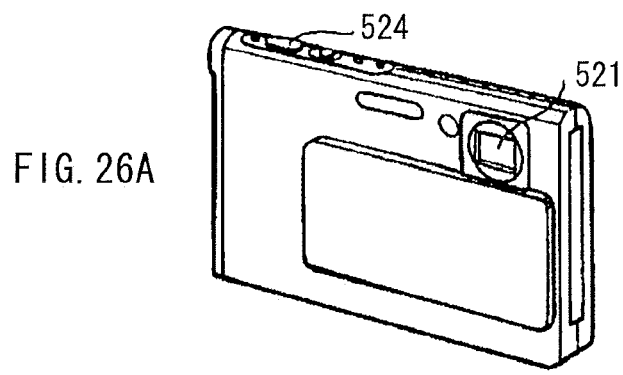
FIGS. 26A and 26B are perspective external views of a second application example, when viewed from the front and the back, respectively.
Figure 26B:
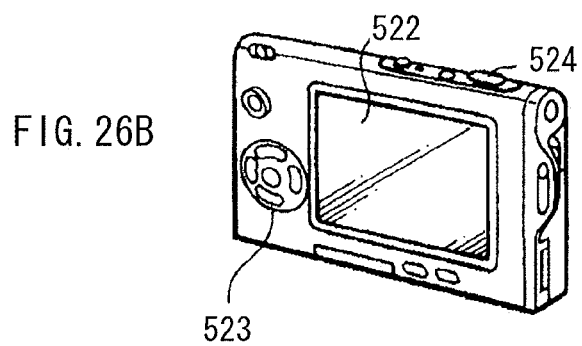

FIGS. 26A and 26B are external views of a digital camera serving as a second example of the electronic apparatuses. This digital camera includes, for example, a flash emitting section 521, a display section 522, a menu switch 523, and a shutter release button 524. The display device with the input function described above is applicable to the display section 522 of this digital camera.

Application Example 3

Figure 27:
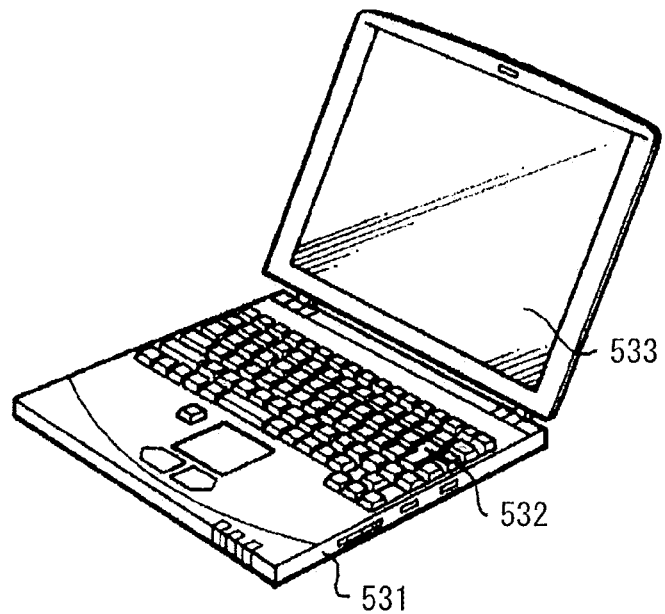
FIG. 27 is an external perspective view of a third application example.

FIG. 27 is an external view of a laptop computer serving as a third example of the electronic apparatuses. This laptop computer includes, for example, a main section 531, a keyboard 532 used to enter characters and the like, and a display section 533 that displays an image. The display device with the input function described above is applicable to the display section 533 of this laptop computer.

Application Example 4

Figure 28:
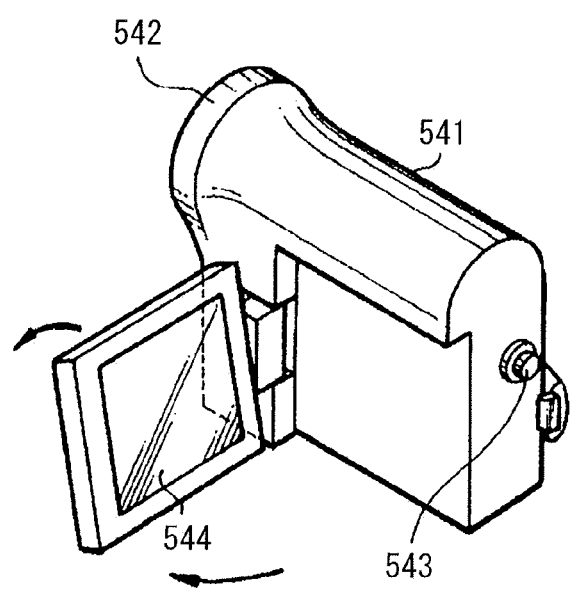
FIG. 28 is an external perspective view of a fourth application example.

FIG. 28 is an external view of a video camera serving as a fourth example of the electronic apparatuses. This video camera includes, for example, a main section 541, a lens 542 disposed on a front face of the main unit 541 to shoot an image of a subject, a start/stop switch 543 used at the time of shooting, and a display section 544. The display device with the input function described above is applicable to the display section 544 of this video camera.

Application Example 5

FIGS. 29A through 29G are external views of a portable telephone serving as a fifth example of the electronic apparatuses. This portable telephone includes, for example, an upper housing 710, a lower housing 720, a coupling section (hinge section) 730 that couples the upper and lower housings 710 and 720 to each other, a display 740, a sub-display 750, a picture light 760, and a camera 770. The display device with the input function described above is applicable to the display 740 or the sub-display 750 of this portable telephone.

Other Embodiments

The present invention may be modified and implemented in various ways without being limited to the above-described embodiment and application examples.

For example, the embodiment and the like have been described above by taking the case of the I/O display panel 20 having the liquid crystal display panel provided with the backlight 15 as an example, but the backlight for display may double as a light for detection, or a light dedicated to detection may be provided. Moreover, when the light for detection is provided, it is preferable to use light in a wavelength range other than a visible-light range (for example, infrared ray).

Further, the embodiment and the like have been described above by employing the display device with the input function, which has the display panel (I/O display panel 20) including the display pixels 31RGB and the sensor elements 33, but the present invention is applicable to any device other than the display device. For example, the present invention is applicable to a mere sensor device without a display function. In this case, for example, in place of the I/O display panel 20, there may be provided a sensor panel in which only the sensor elements 33 are arranged in a matrix form within a single plane while the display pixels 31RGB are not provided.

The present application contains subject matter related to that disclosed in Japanese Priority Patent Application JP2009-260255 filed in the Japan Patent Office on Nov. 13, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A photoelectric conversion method, comprising:
receiving a first detection signal from a first photoelectric conversion element that substantially is shielded from light;
resetting a voltage at a storage node of a second photoelectric conversion element that is exposed to light, based on the first detection signal;
generating a second detection signal based on the light received at the second photoelectric conversion element;
determining a voltage value at the storage node caused by dark current;
adding an offset value to the voltage value caused by dark current; and
multiplying the sum of the offset value and the voltage value caused by dark current by a constant that is less than one to produce a multiplied value.

2. The photoelectric conversion method of claim 1, wherein the first detection signal represents an effect of dark current.

3. The photoelectric conversion method of claim 1, wherein the first detection signal varies with temperature.

4. The photoelectric conversion method of claim 1, further comprising:
calculating a reset value based on the first detection signal; and
resetting the storage node based on the reset value.

5. The photoelectric conversion method of claim 1, further comprising:

adding the multiplied value with a prior reset value to produce a new reset value.

6. The photoelectric conversion method of claim 5, wherein the second photoelectric conversion element is reset based on the new reset value.

7. The photoelectric conversion method of claim 1, further comprising:
applying a reset value to the storage node based on a prior reset voltage and the first detection signal.

8. The photoelectric conversion method of claim 1, wherein an I/O display panel comprises a plurality of second photoelectric conversion elements and one or more light-emitting devices, and the method further comprises:
displaying an image using the one or more light emitting devices; and
detecting a position of an object that operates the I/O display panel using one or more of the plurality of second photoelectric conversion elements.

9. The photoelectric conversion method of claim 8, wherein the first detection signal is generated during a same time period in which the second detection signal is generated.

10. The photoelectric conversion method of claim 8, wherein the first detection signal is generated during a time period in which the one or more light emitting devices are turned off.

11. The photoelectric conversion method of claim 10, further comprising:
generating a third detection signal by the first photoelectric conversion element during a time period in which the one or more light emitting devices is turned on.

12. The photoelectric conversion method of claim 11, further comprising:
determining a differential image based on the first and third detection signals.

13. The photoelectric conversion method of claim 12, further comprising:
detecting the position of the object using the differential image.

14. An apparatus, comprising:
a reset voltage control circuit that receives a first detection signal from a first photoelectric conversion element that substantially is shielded from light, and controls a storage node voltage of a second photoelectric conversion element to be reset based on the first detection signal, wherein the second photoelectric conversion element is exposed to light,
wherein the reset voltage control circuit comprises:
a feedback arithmetic circuit that determines a new reset value based on a prior reset value and the first detection signal; and
a reset voltage generating circuit that generates a new reset voltage based on the new reset value.

15. The apparatus of claim 14, wherein the first detection signal represents an effect of dark current on the first photoelectric conversion element.

16. The apparatus of claim 14, wherein the first detection signal varies with temperature.

17. The apparatus of claim 14, wherein the feedback arithmetic circuit determines a voltage value of a storage node of the first photoelectric conversion element caused by dark current and determines a new reset value to at least partially compensate for the voltage value caused by dark current.

18. The apparatus of claim 14, wherein the reset voltage control circuit provides a reset value for resetting the storage node voltage, and wherein the storage node voltage of the second photoelectric conversion element is reset based on the reset value.

* * * * *